(12) United States Patent
Martin et al.

(10) Patent No.: US 8,872,908 B2
(45) Date of Patent: Oct. 28, 2014

(54) DUAL-IMAGER BIOMETRIC SENSOR

(75) Inventors: Ryan Martin, Tijeras, NM (US); Robert K. Rowe, Corrales, NM (US); Steve Corcoran, Corrales, NM (US); Gary Rogers, Santa Rosa Valley, CA (US)

(73) Assignee: Lumidigm, Inc, Albuquerque, NM (US)

( * ) Notice: Subject to any disclaimer, the term of this patent is extended or adjusted under 35 U.S.C. 154(b) by 899 days.

(21) Appl. No.: 12/869,515

(22) Filed: Aug. 26, 2010

(65) Prior Publication Data

US 2011/0211055 A1      Sep. 1, 2011

Related U.S. Application Data

(60) Provisional application No. 61/237,189, filed on Aug. 26, 2009.

(51) Int. Cl.
*G06K 9/00* (2006.01)
*G06K 9/20* (2006.01)

(52) U.S. Cl.
CPC .......... *G06K 9/2018* (2013.01); *G06K 9/00046* (2013.01); *G06K 9/00033* (2013.01)
USPC ............... 348/77; 348/65; 359/833; 359/837; 382/124

(58) Field of Classification Search
None
See application file for complete search history.

(56) References Cited

U.S. PATENT DOCUMENTS

| | | |
|---|---|---|
| 3,508,830 A | 4/1970 | Hopkins et at |
| 3,619,060 A | 11/1971 | Johnson |
| 3,854,319 A | 12/1974 | Burroughs et al. |
| 3,872,443 A | 3/1975 | Ott |
| 3,910,701 A | 10/1975 | Henderson et al. |
| RE29,008 E | 10/1976 | Ott |
| 4,035,083 A | 7/1977 | Woodriff et al. |
| 4,142,797 A | 3/1979 | Astheimer |
| 4,169,676 A | 10/1979 | Kaiser |
| 4,170,987 A | 10/1979 | Anselmo et al. |
| 4,260,220 A | 4/1981 | Whitehead |
| 4,322,163 A | 3/1982 | Schiller |
| 4,427,889 A | 1/1984 | Muller |
| 4,537,484 A | 8/1985 | Fowler |

(Continued)

FOREIGN PATENT DOCUMENTS

| | | |
|---|---|---|
| CN | 1307711 A | 8/2001 |
| CN | 1402183 A | 3/2003 |

(Continued)

OTHER PUBLICATIONS

Anderson, C. E. et al., "Fundamentals of Calibration Transfer Through Procrustes Analysis," Appln. Spectros., vol. 53, No. 10 (1999) p. 1268-1276.

(Continued)

*Primary Examiner* — Joseph Ustaris
*Assistant Examiner* — Edemio Navas, Jr.
(74) *Attorney, Agent, or Firm* — Marsh Fischmann & Breyfogle LLP; Daniel J. Sherwinter

(57) ABSTRACT

Embodiments disclose a two imager biometric sensor. In some embodiments, the two imagers can include a direct imager and a TIR imager. In some embodiments, multispectral light sources can be used to illuminate target tissue imaged by two imagers. In some embodiments, composite images can be created from images detected using both imagers.

41 Claims, 23 Drawing Sheets
(4 of 23 Drawing Sheet(s) Filed in Color)

(56) References Cited

U.S. PATENT DOCUMENTS

| | | |
|---|---|---|
| 4,598,715 A | 7/1986 | Machler et al. |
| 4,653,880 A | 3/1987 | Sting et al. |
| 4,654,530 A | 3/1987 | Dybwad |
| 4,655,225 A | 4/1987 | Dahne et al. |
| 4,656,562 A | 4/1987 | Sugino |
| 4,657,397 A | 4/1987 | Oehler et al. |
| 4,661,706 A | 4/1987 | Messerschmidt et al. |
| 4,684,255 A | 8/1987 | Ford |
| 4,699,149 A | 10/1987 | Rice |
| 4,712,912 A | 12/1987 | Messerschmidt |
| 4,730,882 A | 3/1988 | Messerschmidt |
| 4,747,147 A | 5/1988 | Sparrow |
| 4,787,013 A | 11/1988 | Sugino et al. |
| 4,787,708 A | 11/1988 | Whitehead |
| 4,830,496 A | 5/1989 | Young |
| 4,853,542 A | 8/1989 | Milosevic et al. |
| 4,857,735 A | 8/1989 | Noller |
| 4,859,064 A | 8/1989 | Messerschmidt et al. |
| 4,866,644 A | 9/1989 | Shenk et al. |
| 4,867,557 A | 9/1989 | Takatani et al. |
| 4,882,492 A | 11/1989 | Schlager |
| 4,883,953 A | 11/1989 | Koashi et al. |
| 4,936,680 A | 6/1990 | Henkes et al. |
| 4,937,764 A | 6/1990 | Komatsu et al. |
| 4,944,021 A | 7/1990 | Hoshino et al. |
| 4,975,581 A | 12/1990 | Robinson et al. |
| 5,015,100 A | 5/1991 | Doyle |
| 5,019,715 A | 5/1991 | Sting et al. |
| 5,028,787 A | 7/1991 | Rosenthal et al. |
| 5,051,602 A | 9/1991 | Sting et al. |
| 5,055,658 A | 10/1991 | Cockburn |
| 5,068,536 A | 11/1991 | Rosenthal |
| 5,070,874 A | 12/1991 | Barnes et al. |
| 5,077,803 A | 12/1991 | Kato et al. |
| 5,088,817 A | 2/1992 | Igaki et al. |
| 5,109,428 A | 4/1992 | Igaki et al. |
| 5,146,102 A | 9/1992 | Higuchi et al. |
| 5,158,082 A | 10/1992 | Jones |
| 5,163,094 A | 11/1992 | Prokoski et al. |
| 5,177,802 A | 1/1993 | Fujimoto et al. |
| 5,178,142 A | 1/1993 | Harjunmaa et al. |
| 5,179,951 A | 1/1993 | Knudson |
| 5,204,532 A | 4/1993 | Rosenthal |
| 5,222,495 A | 6/1993 | Clarke et al. |
| 5,222,496 A | 6/1993 | Clarke et al. |
| 5,223,715 A | 6/1993 | Taylor |
| 5,225,678 A | 7/1993 | Messerschmidt |
| 5,230,702 A | 7/1993 | Lindsay et al. |
| 5,237,178 A | 8/1993 | Rosenthal et al. |
| 5,243,546 A | 9/1993 | Maggard |
| 5,257,086 A | 10/1993 | Fateley et al. |
| 5,258,922 A | 11/1993 | Grill |
| 5,267,152 A | 11/1993 | Yang et al. |
| 5,268,749 A | 12/1993 | Weber et al. |
| 5,291,560 A | 3/1994 | Daugman |
| 5,299,570 A | 4/1994 | Hatschek |
| 5,303,026 A | 4/1994 | Strobl et al. |
| 5,311,021 A | 5/1994 | Messerschmidt |
| 5,313,941 A | 5/1994 | Braig et al. |
| 5,321,265 A | 6/1994 | Block |
| 5,331,958 A | 7/1994 | Oppenheimer |
| 5,335,288 A | 8/1994 | Faulkner |
| 5,348,003 A | 9/1994 | Caro |
| 5,351,686 A | 10/1994 | Steuer et al. |
| 5,355,880 A | 10/1994 | Thomas et al. |
| 5,360,004 A | 11/1994 | Purdy et al. |
| 5,361,758 A | 11/1994 | Hall et al. |
| 5,366,903 A | 11/1994 | Lundsgaard et al. |
| 5,372,135 A | 12/1994 | Mendelson et al. |
| 5,379,764 A | 1/1995 | Barnes et al. |
| 5,402,778 A | 4/1995 | Chance |
| 5,405,315 A | 4/1995 | Khuri et al. |
| 5,413,096 A | 5/1995 | Hart |
| 5,413,098 A | 5/1995 | Benaron et al. |
| 5,419,321 A | 5/1995 | Evans |
| 5,435,309 A | 7/1995 | Thomas et al. |
| 5,441,053 A | 8/1995 | Lodder et al. |
| 5,452,723 A | 9/1995 | Wu et al. |
| 5,459,317 A | 10/1995 | Small et al. |
| 5,459,677 A | 10/1995 | Kowalski et al. |
| 5,460,177 A | 10/1995 | Purdy et al. |
| 5,483,335 A | 1/1996 | Tobias |
| 5,494,032 A | 2/1996 | Robinson et al. |
| 5,505,726 A | 4/1996 | Meserol |
| 5,507,723 A | 4/1996 | Keshaviah |
| 5,515,847 A | 5/1996 | Braig et al. |
| 5,518,623 A | 5/1996 | Keshaviah et al. |
| 5,523,054 A | 6/1996 | Switalski et al. |
| 5,533,509 A | 7/1996 | Koashi et al. |
| 5,537,208 A | 7/1996 | Bertram et al. |
| 5,539,207 A | 7/1996 | Wong et al. |
| 5,552,997 A | 9/1996 | Massart |
| 5,559,504 A | 9/1996 | Itsumi et al. |
| 5,568,251 A | 10/1996 | Davies et al. |
| 5,596,992 A | 1/1997 | Haaland et al. |
| 5,606,164 A | 2/1997 | Price et al. |
| 5,613,014 A | 3/1997 | Eshera et al. |
| 5,630,413 A | 5/1997 | Thomas et al. |
| 5,636,633 A | 6/1997 | Messerschmidt et al. |
| 5,655,530 A | 8/1997 | Messerschmidt |
| 5,672,864 A | 9/1997 | Kaplan |
| 5,672,875 A | 9/1997 | Block et al. |
| 5,677,762 A | 10/1997 | Ortyn et al. |
| 5,681,273 A | 10/1997 | Brown |
| 5,708,593 A | 1/1998 | Saby et al. |
| 5,719,399 A | 2/1998 | Alfano et al. |
| 5,719,950 A | 2/1998 | Osten et al. |
| 5,724,268 A | 3/1998 | Sodickson et al. |
| 5,729,619 A | 3/1998 | Puma |
| 5,737,439 A | 4/1998 | Lapsley et al. |
| 5,743,262 A | 4/1998 | Lepper, Jr. et al. |
| 5,747,806 A | 5/1998 | Khalil |
| 5,750,994 A | 5/1998 | Schlager |
| 5,751,835 A | 5/1998 | Topping et al. |
| 5,751,836 A | 5/1998 | Wildes et al. |
| 5,761,330 A | 6/1998 | Stoianov et al. |
| 5,782,755 A | 7/1998 | Chance et al. |
| 5,792,050 A | 8/1998 | Alam et al. |
| 5,792,053 A | 8/1998 | Skladner et al. |
| 5,793,881 A | 8/1998 | Stiver et al. |
| 5,796,858 A | 8/1998 | Zhou et al. |
| 5,808,739 A | 9/1998 | Turner et al. |
| 5,818,048 A | 10/1998 | Sodickson et al. |
| 5,823,951 A | 10/1998 | Messerschmidt et al. |
| 5,828,066 A | 10/1998 | Messerschmidt |
| 5,830,132 A | 11/1998 | Robinson |
| 5,830,133 A | 11/1998 | Osten et al. |
| 5,850,623 A | 12/1998 | Carman, Jr. et al. |
| 5,853,370 A | 12/1998 | Chance et al. |
| 5,857,462 A | 1/1999 | Thomas et al. |
| 5,859,420 A | 1/1999 | Borza |
| 5,860,421 A | 1/1999 | Eppstein et al. |
| 5,867,265 A | 2/1999 | Thomas |
| 5,886,347 A | 3/1999 | Inoue et al. |
| 5,902,033 A | 5/1999 | Levis et al. |
| 5,914,780 A | 6/1999 | Turner et al. |
| 5,929,443 A | 7/1999 | Alfano et al. |
| 5,933,792 A | 8/1999 | Andersen et al. |
| 5,935,062 A | 8/1999 | Messerschmidt et al. |
| 5,945,676 A | 8/1999 | Khalil |
| 5,949,543 A | 9/1999 | Bleier et al. |
| 5,957,841 A | 9/1999 | Maruo et al. |
| 5,961,449 A | 10/1999 | Toida et al. |
| 5,963,319 A | 10/1999 | Jarvis et al. |
| 5,978,495 A | 11/1999 | Thomopoulos et al. |
| 5,987,346 A | 11/1999 | Benaron et al. |
| 5,999,637 A | 12/1999 | Toyoda et al. |
| 6,005,722 A | 12/1999 | Butterworth et al. |
| 6,016,435 A | 1/2000 | Maruo et al. |
| 6,025,597 A | 2/2000 | Sterling et al. |
| 6,026,314 A | 2/2000 | Amerov et al. |
| 6,028,773 A | 2/2000 | Hundt |
| 6,031,609 A | 2/2000 | Funk et al. |
| 6,034,370 A | 3/2000 | Messerschmidt |

(56) References Cited

U.S. PATENT DOCUMENTS

| | | |
|---|---|---|
| 6,040,578 A | 3/2000 | Malin et al. |
| 6,041,247 A | 3/2000 | Weckstrom et al. |
| 6,041,410 A | 3/2000 | Hsu et al. |
| 6,043,492 A | 3/2000 | Lee et al. |
| 6,044,285 A | 3/2000 | Chaiken et al. |
| 6,045,502 A | 4/2000 | Eppstein et al. |
| 6,046,808 A | 4/2000 | Fately |
| 6,049,727 A | 4/2000 | Crothall |
| 6,056,738 A | 5/2000 | Marchitto et al. |
| 6,057,925 A | 5/2000 | Anthon |
| 6,061,581 A | 5/2000 | Alam et al. |
| 6,061,582 A | 5/2000 | Small et al. |
| 6,066,847 A | 5/2000 | Rosenthal |
| 6,069,689 A | 5/2000 | Zeng et al. |
| 6,070,093 A | 5/2000 | Oosta et al. |
| 6,073,037 A | 6/2000 | Alam et al. |
| 6,081,612 A | 6/2000 | Gutkowicz-Krusin et al. |
| 6,088,605 A | 7/2000 | Griffith et al. |
| 6,088,607 A | 7/2000 | Diab et al. |
| 6,097,035 A | 8/2000 | Belongie et al. |
| 6,100,811 A | 8/2000 | Hsu et al. |
| 6,115,484 A | 9/2000 | Bowker et al. |
| 6,115,673 A | 9/2000 | Malin et al. |
| 6,122,042 A | 9/2000 | Wunderman et al. |
| 6,122,394 A | 9/2000 | Neukermans et al. |
| 6,122,737 A | 9/2000 | Bjorn et al. |
| 6,125,192 A | 9/2000 | Bjorn et al. |
| 6,141,101 A | 10/2000 | Bleier et al. |
| 6,147,749 A | 11/2000 | Kubo et al. |
| 6,148,094 A | 11/2000 | Kinsella |
| 6,152,876 A | 11/2000 | Robinson et al. |
| 6,154,658 A | 11/2000 | Caci |
| 6,157,041 A | 12/2000 | Thomas et al. |
| 6,159,147 A | 12/2000 | Lichter et al. |
| 6,172,743 B1 | 1/2001 | Kley et al. |
| 6,175,407 B1 | 1/2001 | Sartor |
| 6,181,414 B1 | 1/2001 | Raz et al. |
| 6,181,958 B1 | 1/2001 | Steuer et al. |
| 6,188,781 B1 | 2/2001 | Brownlee |
| 6,193,153 B1 | 2/2001 | Lambert |
| 6,208,749 B1 | 3/2001 | Gutkowicz-Krusin |
| 6,212,424 B1 | 4/2001 | Robinson |
| 6,226,541 B1 | 5/2001 | Eppstein et al. |
| 6,229,908 B1 | 5/2001 | Edmonds et al. |
| 6,230,034 B1 | 5/2001 | Messerschmidt et al. |
| 6,236,047 B1 | 5/2001 | Malin et al. |
| 6,240,306 B1 | 5/2001 | Rohrscheib et al. |
| 6,240,309 B1 | 5/2001 | Yamashita et al. |
| 6,241,663 B1 | 6/2001 | Wu et al. |
| 6,256,523 B1 | 7/2001 | Diab et al. |
| 6,272,367 B1 | 8/2001 | Chance |
| 6,280,381 B1 | 8/2001 | Malin et al. |
| 6,282,303 B1 | 8/2001 | Brownlee |
| 6,285,895 B1 | 9/2001 | Ristolainen et al. |
| 6,292,576 B1 | 9/2001 | Brownlee |
| 6,301,375 B1 | 10/2001 | Choi |
| 6,301,815 B1 | 10/2001 | Sliwa |
| 6,304,767 B1 | 10/2001 | Soller et al. |
| 6,307,633 B1 | 10/2001 | Mandella et al. |
| 6,309,884 B1 | 10/2001 | Cooper et al. |
| 6,317,507 B1 | 11/2001 | Dolfing et al. |
| 6,324,310 B1 | 11/2001 | Brownlee |
| 6,330,346 B1 | 12/2001 | Peterson et al. |
| 6,404,904 B1 | 6/2002 | Einighammer et al. |
| 6,419,361 B2 | 7/2002 | Cabib et al. |
| 6,483,929 B1 | 11/2002 | Murakami et al. |
| 6,504,614 B1 | 1/2003 | Messerschmidt et al. |
| 6,537,225 B1 | 3/2003 | Mills |
| 6,560,352 B2 | 5/2003 | Rowe et al. |
| 6,574,490 B2 | 6/2003 | Abbink et al. |
| 6,597,945 B2 | 7/2003 | Marksteiner |
| 6,606,509 B2 | 8/2003 | Schmitt |
| 6,628,809 B1 | 9/2003 | Rowe et al. |
| 6,631,199 B1 | 10/2003 | Topping et al. |
| 6,741,729 B2 | 5/2004 | Bjorn et al. |
| 6,749,115 B2 | 6/2004 | Gressel et al. |
| 6,799,275 B1 | 9/2004 | Bjorn |
| 6,799,726 B2 | 10/2004 | Stockhammer |
| 6,816,605 B2 | 11/2004 | Rowe et al. |
| 6,825,930 B2 | 11/2004 | Cronin et al. |
| 6,853,444 B2 | 2/2005 | Haddad |
| 6,898,299 B1 | 5/2005 | Brooks |
| 6,928,181 B2 | 8/2005 | Brooks |
| 6,937,885 B1 | 8/2005 | Lewis et al. |
| 6,958,194 B1 | 10/2005 | Hopper et al. |
| 6,995,384 B2 | 2/2006 | Lee et al. |
| 7,047,419 B2 | 5/2006 | Black |
| 7,084,415 B2 | 8/2006 | Iwai |
| 7,147,153 B2 | 12/2006 | Rowe et al. |
| 7,254,255 B2 | 8/2007 | Dennis |
| 7,263,213 B2 | 8/2007 | Rowe |
| 7,287,013 B2 | 10/2007 | Schneider et al. |
| 7,347,365 B2 | 3/2008 | Rowe |
| 7,366,331 B2 | 4/2008 | Higuchi |
| 7,386,152 B2 | 6/2008 | Rowe et al. |
| 7,394,919 B2 | 7/2008 | Rowe et al. |
| 7,397,943 B2 | 7/2008 | Merbach et al. |
| 7,440,597 B2 | 10/2008 | Rowe |
| 7,460,696 B2 | 12/2008 | Rowe |
| 7,508,965 B2 | 3/2009 | Rowe et al. |
| 7,515,252 B2 | 4/2009 | Hernandez |
| 7,539,330 B2 | 5/2009 | Rowe |
| 7,545,963 B2 | 6/2009 | Rowe |
| 7,627,151 B2 | 12/2009 | Rowe |
| 7,668,350 B2 | 2/2010 | Rowe |
| 7,735,729 B2 | 6/2010 | Rowe |
| 7,751,594 B2 | 7/2010 | Rowe et al. |
| 7,801,338 B2 | 9/2010 | Rowe |
| 7,801,339 B2 | 9/2010 | Sidlauskas et al. |
| 7,804,984 B2 | 9/2010 | Sidlauskas et al. |
| 7,819,311 B2 | 10/2010 | Rowe et al. |
| 7,831,072 B2 | 11/2010 | Rowe |
| 7,835,554 B2 | 11/2010 | Rowe |
| 7,899,217 B2 | 3/2011 | Uludag et al. |
| 7,995,808 B2 | 8/2011 | Rowe et al. |
| 2002/0009213 A1 | 1/2002 | Rowe et al. |
| 2002/0065468 A1 | 5/2002 | Utzinger et al. |
| 2002/0101566 A1 | 8/2002 | Elsner et al. |
| 2002/0111546 A1 | 8/2002 | Cook et al. |
| 2002/0138768 A1 | 9/2002 | Murakami et al. |
| 2002/0171834 A1 | 11/2002 | Rowe et al. |
| 2002/0183624 A1 | 12/2002 | Rowe et al. |
| 2003/0025897 A1 | 2/2003 | Iwai |
| 2003/0044051 A1 | 3/2003 | Fujieda |
| 2003/0078504 A1 | 4/2003 | Rowe |
| 2003/0128867 A1 | 7/2003 | Bennett |
| 2003/0163710 A1 | 8/2003 | Ortiz et al. |
| 2003/0223621 A1 | 12/2003 | Rowe et al. |
| 2004/0003295 A1 | 1/2004 | Elderfield et al. |
| 2004/0008875 A1 | 1/2004 | Linares |
| 2004/0022421 A1 | 2/2004 | Endoh et al. |
| 2004/0042642 A1 | 3/2004 | Bolle et al. |
| 2004/0047493 A1 | 3/2004 | Rowe et al. |
| 2004/0114783 A1 | 6/2004 | Spycher et al. |
| 2004/0120553 A1 | 6/2004 | Stobbe |
| 2004/0125994 A1 | 7/2004 | Engles et al. |
| 2004/0179722 A1 | 9/2004 | Moritoki et al. |
| 2004/0240712 A1 | 12/2004 | Rowe et al. |
| 2004/0240713 A1 | 12/2004 | Hata |
| 2004/0264742 A1 | 12/2004 | Zhang et al. |
| 2005/0007582 A1 | 1/2005 | Villers et al. |
| 2005/0125339 A1 | 6/2005 | Tidwell et al. |
| 2005/0169504 A1 | 8/2005 | Black |
| 2005/0180620 A1 | 8/2005 | Takiguchi |
| 2005/0185847 A1 | 8/2005 | Rowe |
| 2005/0205667 A1 | 9/2005 | Rowe |
| 2005/0265585 A1 | 12/2005 | Rowe |
| 2005/0265586 A1* | 12/2005 | Rowe et al. .............. 382/124 |
| 2005/0265607 A1 | 12/2005 | Chang |
| 2005/0271258 A1 | 12/2005 | Rowe |
| 2006/0002597 A1 | 1/2006 | Rowe |
| 2006/0002598 A1 | 1/2006 | Rowe et al. |
| 2006/0045330 A1 | 3/2006 | Marion |
| 2006/0062438 A1 | 3/2006 | Rowe |

(56) References Cited

U.S. PATENT DOCUMENTS

| | | |
|---|---|---|
| 2006/0110015 A1 | 5/2006 | Rowe |
| 2006/0115128 A1 | 6/2006 | Mainguet |
| 2006/0171571 A1 | 8/2006 | Chan et al. |
| 2006/0173256 A1 | 8/2006 | Ridder et al. |
| 2006/0202028 A1 | 9/2006 | Rowe |
| 2006/0210120 A1 | 9/2006 | Rowe |
| 2006/0244947 A1 | 11/2006 | Rowe |
| 2006/0274921 A1 | 12/2006 | Rowe |
| 2007/0014437 A1 | 1/2007 | Sato |
| 2007/0030475 A1 | 2/2007 | Rowe et al. |
| 2007/0052827 A1 | 3/2007 | Hiltunen |
| 2007/0116331 A1 | 5/2007 | Rowe et al. |
| 2007/0153258 A1 | 7/2007 | Hernandez |
| 2007/0165903 A1 | 7/2007 | Munro et al. |
| 2008/0008359 A1 | 1/2008 | Beenau et al. |
| 2008/0013806 A1 | 1/2008 | Hamid |
| 2008/0025579 A1 | 1/2008 | Sidlauskas et al. |
| 2008/0025580 A1 | 1/2008 | Sidlauskas et al. |
| 2008/0192988 A1 | 8/2008 | Uludag et al. |
| 2008/0232653 A1 | 9/2008 | Rowe |
| 2008/0260211 A1 | 10/2008 | Bennett et al. |
| 2008/0298649 A1 | 12/2008 | Ennis et al. |
| 2009/0046903 A1 | 2/2009 | Corcoran et al. |
| 2009/0080709 A1 | 3/2009 | Rowe et al. |
| 2009/0092290 A1 | 4/2009 | Rowe |
| 2009/0148005 A1 | 6/2009 | Rowe |
| 2009/0245591 A1 | 10/2009 | Rowe et al. |
| 2010/0067748 A1 | 3/2010 | Rowe |
| 2010/0246902 A1 | 9/2010 | Rowe et al. |
| 2011/0085708 A1 | 4/2011 | Martin et al. |
| 2011/0235872 A1 | 9/2011 | Rowe et al. |

FOREIGN PATENT DOCUMENTS

| | | |
|---|---|---|
| CN | 1509454 A | 6/2004 |
| DE | 10153808 | 5/2003 |
| EP | 0 280 418 A1 | 8/1988 |
| EP | 0 372 748 | 6/1990 |
| EP | 0 897 164 A2 | 2/1999 |
| EP | 0 924 656 A2 | 6/1999 |
| EP | 1 353 292 | 10/2003 |
| EP | 1 434 162 A2 | 6/2004 |
| FR | 2761180 A1 | 9/1998 |
| JP | 61182174 A | 8/1986 |
| JP | 7075629 A | 3/1995 |
| JP | 2001033381 A | 2/2001 |
| JP | 2001-184490 A | 7/2001 |
| JP | 2002-133402 A | 5/2002 |
| JP | 2002-517835 A | 6/2002 |
| JP | 2003000993 A | 2/2003 |
| JP | 2003-511101 A | 3/2003 |
| JP | 2003-308520 A | 10/2003 |
| WO | WO 92/00513 A1 | 1/1992 |
| WO | WO 92/17765 A1 | 10/1992 |
| WO | WO 93/07801 A1 | 4/1993 |
| WO | WO 99/27848 A1 | 6/1999 |
| WO | WO 00/30530 | 6/2000 |
| WO | WO 00/46739 A1 | 8/2000 |
| WO | WO 01/15596 A1 | 3/2001 |
| WO | WO 01/18332 A1 | 3/2001 |
| WO | WO 01/27882 A2 | 4/2001 |
| WO | WO 01/52180 A1 | 7/2001 |
| WO | WO 01/52726 A1 | 7/2001 |
| WO | WO 01/53805 A1 | 7/2001 |
| WO | WO 01/65471 A | 9/2001 |
| WO | WO 01/69520 A2 | 9/2001 |
| WO | WO 02/054337 A1 | 7/2002 |
| WO | WO 02/084605 A2 | 10/2002 |
| WO | WO 02/099393 A2 | 12/2002 |
| WO | WO 03/010510 A2 | 2/2003 |
| WO | WO 03/096272 A1 | 11/2003 |
| WO | WO 2004/068388 A2 | 8/2004 |
| WO | WO 2004/068394 A1 | 8/2004 |
| WO | WO 2004068394 | 8/2004 |
| WO | WO 2004/090786 | 10/2004 |
| WO | WO 2006/049394 A | 5/2006 |
| WO | WO 2006/077446 A2 | 7/2006 |
| WO | WO 2006/093508 A2 | 9/2006 |

OTHER PUBLICATIONS

Ashbourn, Julian, Biometrics; Advanced Identity Verification, Springer, 2000, pp. 63-64).

Bantle, John P. et al., "Glucose Measurement in Patients With Diabetes Mellitus With Dermal Interstitial Fluid," Mosby-Year Book, Inc., 9 pages, 1997.

Berkoben, Michael S. et al., "Vascular Access for Hemodialysis," Clinical Dialysis, Third Edition, pp. 2 cover pages and 26-45, 1995.

Blank, T.B. et al., "Transfer of Near-Infrared Multivariate Calibrations Without Standards," Anal. Chem., vol. 68 (1996) p. 2987.

Bleyer, Anthony J. et al., "The Costs of Hospitalizations Due to Hemodialysis Access Management," Nephrology News & Issues, pp. 19, 20 and 22, Jan. 1995.

Brasunas John C. et al., "Uniform Time-Sampling Fourier Transform Spectroscopy," Applied Optics, vol. 36, No. 10, Apr. 1, 1997, pp. 2206-2210.

Brault, James W., "New Approach to High-Precision Fourier Transform Spectrometer Design," Applied Optics, Vo. 35, No. 16, Jun. 1, 1996, pp. 2891-2896.

Brochure entitled "Improve the Clinical Outcome of Every Patient", In Line Diagnostics, published on or before Oct. 30, 1997, 2 pages.

Cassarly, W.J. et al., "Distributed Lighting Systems: Uniform Light Delivery," Source Unknown, pp. 1698-1702.

Chang, Chong-Min et al., "An Uniform Rectangular Illuminating Optical System for Liquid Crystal Light Valve Projectors," Euro Display '96 (1996) pp. 257-260.

Coyne, Lawrence J. et al., "Distributive Fiber Optic couplers Using Rectangular Lightguides as Mixing Elements," (Information Gatekeepers, Inc. Brookline, MA, 1979) pp. 160-164.

Daugirdas, JT et al., "Comparison of Methods to Predict the Equilibrated Kt/V (eK/V) in the Hemo Study," National Institutes of Health, pp. 1-28, Aug. 20, 1996.

de Noord, Onno E., "Multivariate Calibration Standardization," Chemometrics and intelligent Laboratory Systems 25, (1994) pp. 85-97.

Demos, S. G. et al., "Optical Fingerprinting Using Polarisation Contrast Improvement," Electronics Letters, vol. 33, No. 7, pp. 582-584, Mar. 27, 1997.

Depner, Thomas A. et al., "Clinical Measurement of Blood Flow in Hemodialysis Access Fistulae and Grafts by Ultrasound Dilution," Division of Nephrology, University of California, pp. M745-M748, published on or before Oct. 30, 1997.

Despain, Alvin M. et al., "A Large-Aperture Field-Widened Interferometer-Spectrometer for Airglow Studies," Aspen International Conference on Fourier Spectroscopy, 1970, pp. 293-300.

Faber, Nicolaas, "Multivariate Sensitivity for the Interpretation of the Effect of Spectral Pretreatment Methods on Near-Infrared Calibration Model Predictions," Analytical Chemistry, vol. 71, No. 3, Feb. 1, 1999, pp. 557-565.

Fresenius USA, "Determination of Delivered Therapy Through Measurement of Effective Clearance," 2 pages, Dec. 1994.

Geladi, Paul et al., A Multivariate NIR Study of Skin Alterations in Diabetic Patients as Compared to Control Subjects, J. Near Infrared Spectrosc., vol. 8 (2000) pp. 217-227.

Hakim, Raymond M. et al., "Effects of Dose of Dialysis on Morbidity and Mortality," American Journal of Kidney Diseases, vol. 23, No. 5, pp. 661-669, May 1994.

Jacobs, Paul et al., "A Disposable Urea Sensor for Continuous Monitoring of Hemodialysis Efficiency," ASAIO Journal, pp. M353-M358, 1993.

Keshaviah, Prakash R. et al., "On-Line Monitoring of the Delivery of the Hemodialysis Prescription," Pediatric Nephrology, vol. 9, pp. S2-S8, 1995.

Krivitski, Nikolai M., "Theory and Validation of Access Flow Measurement by Dilution Technique During Hemodialysis," Kidney International, vol. 48, pp. 244-250, 1995.

(56) References Cited

OTHER PUBLICATIONS

Lee et al., "Fingerprint Recognition Using Principal Gabor Basis Function", Proceedings of 2001 International Symposium on Intelligent Multimedia, Video and Speech Processing, May 2-4, 2001, Sections 2-3.

Maltoni et al., "Handbook of Fingerprint Recognition," 2005, pp. 58-61.

Marbach, Ralf, "Measurement Techniques for IR Spectroscopic Blood Glucose Determination," Fortschritt Bericht, Series 8: Measurement and Control Technology, No. 346, pp. cover and 1-158, Mar. 28, 1994.

Mardia, K.V. et al. "Chapter 11—Discriminant Analysis," Multivariate Analysis, pp. 2 cover pages and 300-325, 1979.

Nichols, Michael G. et al., "Design and Testing of a White-Light, Steady-State Diffuse Reflectance Spectrometer for Determination of Optical Properties of Highly Scattering Systems," Applied Optics, vol. 36, No. 1, pp. 93-104, Jan. 1, 1997.

Nixon, Kristin A. et al., "Novel Spectroscopy-Based Technology for Biometric and Liveness Verification", Technology for Human Identification. Proceedings od SPIE, vol. 5404, No. 1, XP-002458441, Apr. 12-13, 2004, pp. 287-295 (ISSN: 0277-786x).

Pan et al., "Face Recognition in Hyperspectral Images", IEEE Transactions on Pattern Analysis and Machine Intelligence vol. 25, No. 12, Dec. 2003.

Ripley, B. D., "Chapter 3—Linear Discriminant Analysis," Pattern Recognition and Neural Networks, pp. 3 cover pages and 91-120, 1996.

Ronco, C. et al., "On-Line Urea Monitoring : A Further Step Towards Adequate Dialysis Prescription and Delivery," The International Journal of Artificial Organs, vol. 18, No. 9, pp. 534-543, 1995.

Ross et al., "A Hybrid Fingerprint Matcher," Pattern Recognition 36, The Journal of the Pattern Recognition Society, 2003 Elsevier Science Ltd., pp. 1661-1673.

Selvaraj et al., Fingerprint Verification Using Wavelet Transform, Proceedings of the Fifth International Conference on Computational Intelligence and Multimedia Applications, IEEE, 2003.

Service, F. John et al., "Dermal Interstitial Glucose as an Indicator of Ambient Glycemia," Diabetes Care, vol. 20, No. 9, 8 pages, Aug. 1997.

Sherman, Richard A., "Chapter 4—Recirculation in the Hemodialysis Access," Principles and Practice of Dialysis, pp. 2 cover pages and 38-46, 1994.

Sherman, Richard A., "The Measurement of Dialysis Access Recirculation," American Journal of Kidney Diseases, vol. 22, No. 4, pp. 616-621, Oct. 1993.

Steuer, Robert R. et al, "A New Optical Technique for Monitoring Hematocrit and Circulating Blood Volume: Its Application in Renal Dialysis," Dialysis & Transplantation, vol. 22, No. 5, pp. 260-265, May 1993.

Webb, Paul, "Temperatures of Skin, Subcutaneous Tissue, Muscle and Core in Resting Men in Cold, Comfortable and Hot Conditions," European Journal of Applied Physiology, vol. 64, pp. 471-476, 1992.

Zavala, Albert et al., "Using Fingerprint Measures to Predict Other Anthropometric Variables," Human Factors, vol. 17, No. 6, pp. 591-602, 1975.

Chinese Patent Application No. 2006/80038579.4, First Office Action mailed on Mar. 23, 2011, 7 pages.

European Patent Application No. 10166537.0, Extended European Search Report mailed on Jun. 1, 2011, 7 pages.

International Search Report and Written Opinion of PCT/US2010/025463 mailed on Jun. 30, 2010, 12 pages.

Rowe, et al. "Multispectral Fingerprint Image Acquisition," Advance in Biometrics, 2008, 22 pages.

International Search Report and Written Opinion of PCT/US2008/066585 mailed Oct. 30, 2008, 10 pages.

International Search Report of PCT/US2010/046852 mailed Dec. 29, 2010, 5 pages.

Rowe, "LumiGuard: A Novel Spectroscopic Sensor for Biometric Security Applications", American Chemical Society 225th National Meeting, Mar. 25, 2003, 20 pages.

\* cited by examiner (in color)

(in color)

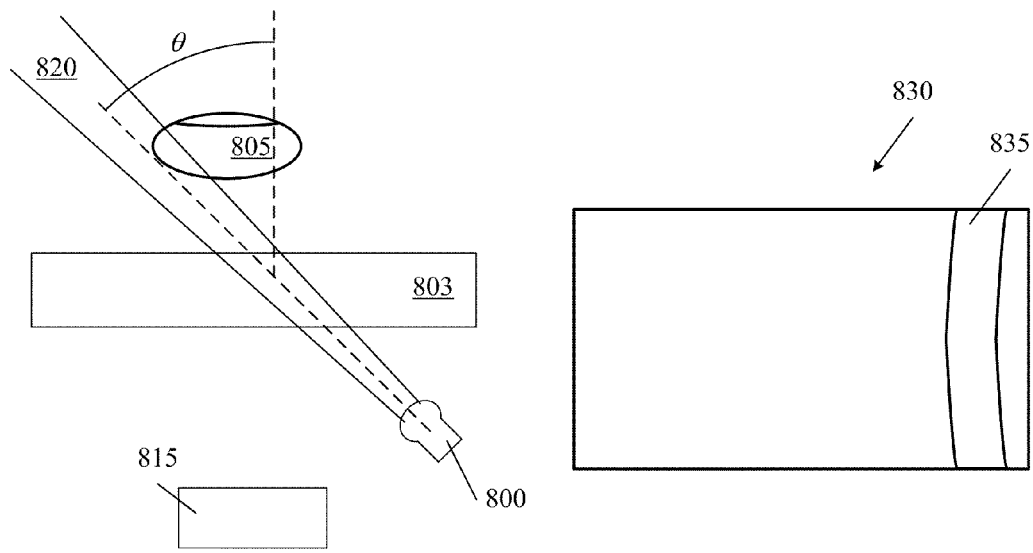
*Figure 8B*
*Figure 8A*
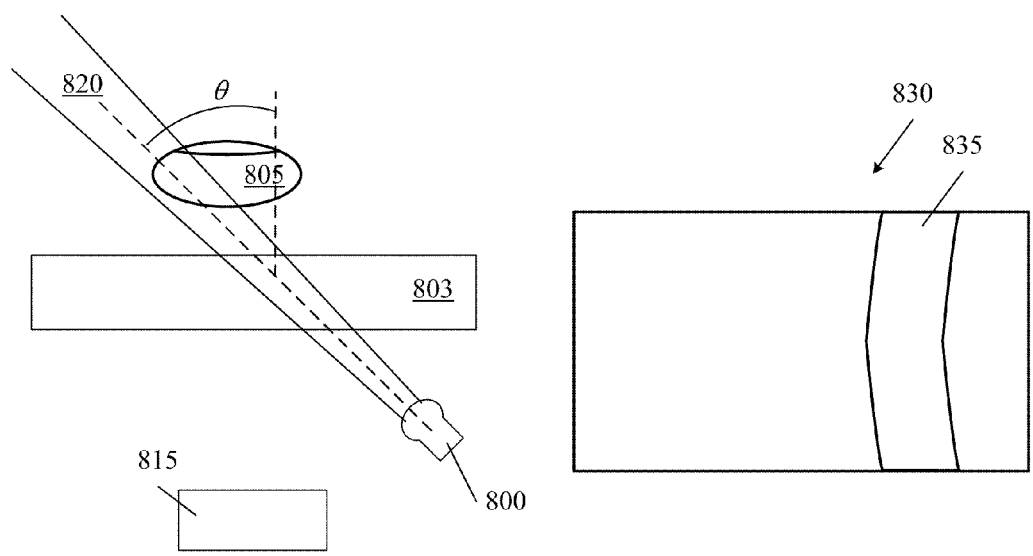
*Figure 9B*
*Figure 9A*

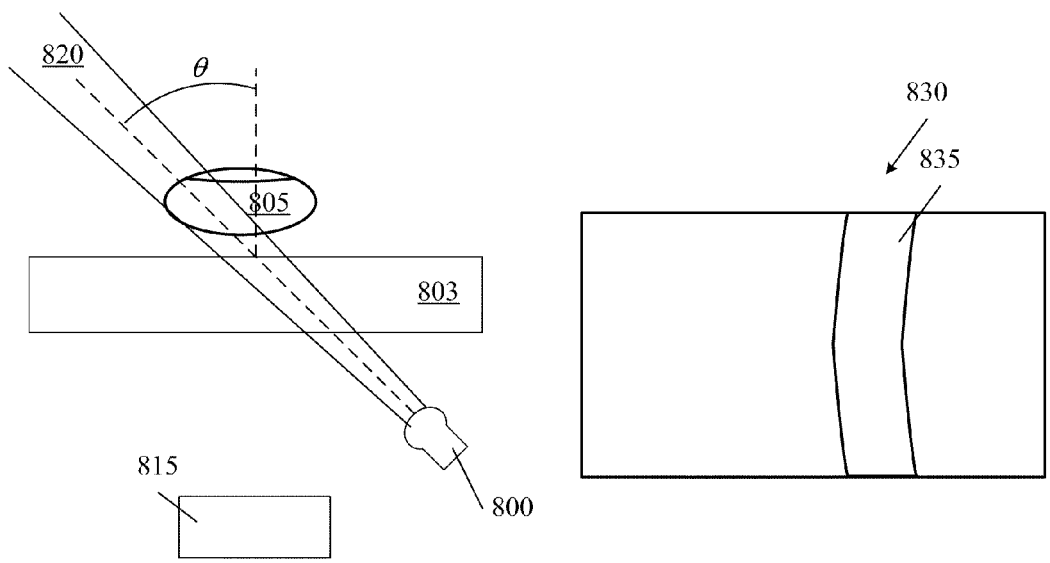
Figure 10A
Figure 10B
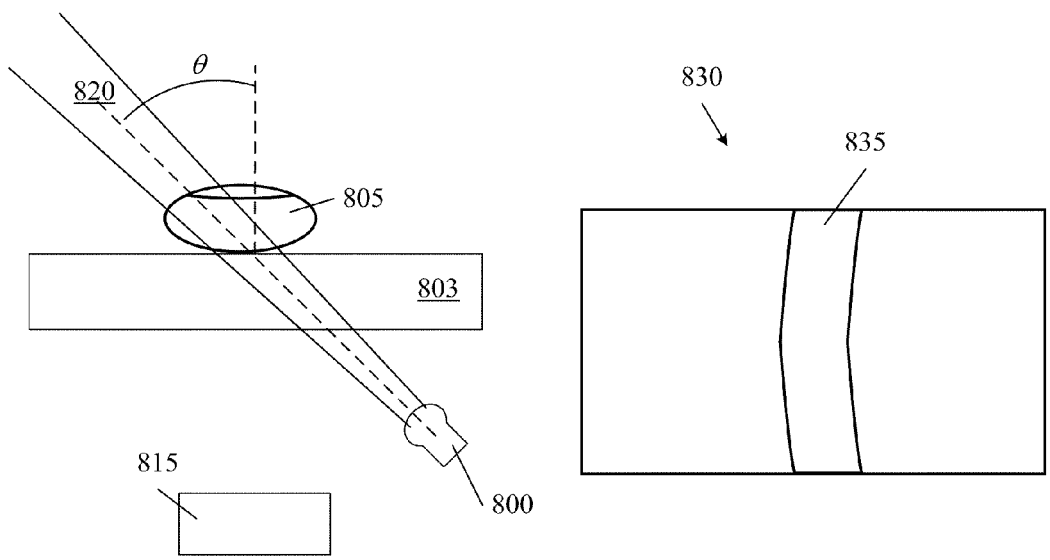
Figure 11A
Figure 11B

*(in color)*

*(in color)*

DUAL-IMAGER BIOMETRIC SENSOR

CROSS-REFERENCES TO RELATED APPLICATIONS

This application is a non-provisional, and claims the benefit, of commonly assigned U.S. Provisional Application No. 61/237,189, filed Aug. 26, 2009, entitled "Multiplexed Biometric Imaging and Dual-Imager Biometric Sensor," the entirety of which is herein incorporated by reference for all purposes.

BACKGROUND

Multispectral sensors can acquire images of an object under a plurality of distinct illumination and/or imaging conditions. Images from multispectral sensors can be used for various purposes such as for biometric imaging, bar code reading and authentication, documentation authentication, and quality assurance, to name a few.

Conventional optical fingerprint sensors typically incorporate a single total internal reflectance (TIR) imager, which can require that a number of conditions be met to provide a good fingerprint image. These conditions can include the requirement that the fingerprint ridges are intact, clean, in optical contact with the sensor surface, and that the skin is of proper moisture content, i.e., neither too dry nor too wet. If any of these conditions aren't met, the resulting fingerprint image can be degraded or even missing entirely. However, when these conditions are met, the resulting image is generally of high quality and useful for both automated analysis and analysis by a human observer.

Multispectral sensors and others based on direct imaging can acquire images under a much broader range of conditions of the skin, the local environment, and the nature of the interface between the skin and sensor. However, such images are generally of lower contrast than the corresponding TIR image, if the TIR image is of high quality.

It can be a time consuming process for a sensor to illuminate and acquire images from the plurality of distinct optical and/or imaging conditions. Multispectral sensors often have difficulty determining when an object is properly placed at the sensor for imaging, determining whether an object is a proper object for imaging, and/or distinguishing between an object for imaging and background objects.

SUMMARY

Various embodiments of the invention are described herein involving multispectral dual imaging.

In various embodiments of the invention, a multispectral dual imaging system is disclosed. Two imagers can be used to simultaneously collect two images of a skin site under different imaging conditions. For example, one imager can directly image the skin site, while another images the skin site under TIR conditions. Various illuminators can be included to illuminate the skin site. In some embodiments, a prism can be used that allows the two imagers to image the skin site under both direct and TIR conditions.

Various configuration can be used. For instance, a first illumination source (e.g. an LED) can be used to illuminating a finger through a first facet of a multifaceted prism. Light from the first illumination source can undergo total internal reflectance at a second facet of the multifaceted prism prior to illuminating the object. A first imager can image light scattered from the finger and passing through the first facet at an angle less than the critical angle and undergoing total internal reflectance at the second facet. A second imager can image light scattered from the finger and passing though the first facet at an angle less than the critical angle. In some embodiments, the second imager can be located in a position such that it does not image light from the second illumination source that is totally internally reflected at the first facet.

In some embodiments, the second imager can be located out of phase from the second illumination source. That is light from the second illumination source can only image light from the second imager after it is absorbed and/or scattered by the object. And, in this embodiment, light totally internally reflected at the first facet is not imaged by the second imager. For example, the second imager can be located at an azimuthal angle out of line with the second illumination source; such as an angle less than 170°. In some embodiments, this angle is 90°. The second imager can also be located to image light at greater or less than the critical angle.

In another embodiment, a first illumination source can illuminate an object located at a first facet of a multifaceted prism. The system can include a second illumination source that can illuminate the object through a second facet and through the first facet at an angle greater than the critical angle of the first facet. A first imager can image light scattered by the object that passes through the first facet at an angle less than the critical angle and undergoes total internal reflectance at the second facet. A second imager can be used to image light totally internally reflected from the first facet.

In some embodiments, the fingerprint sensor of the present invention may be used to collect non-fingerprint images; for example, money, documents, bar codes, manufactured parts, etc. In some of these images optical security markings such as holograms, color-changing ink and other such markings may be present and used to confirm that the documents or barcodes by assessing the images that correspond to different illumination conditions.

In some embodiments, the dual imager of the present invention may be used to collect finger or hand print images as well as iris images, facial images, surveillance images, detect motion, detect ambient lighting conditions, barcode images, security document images, and perform a variety of other such functions. In some embodiments the direct imager may include an automatic, variable focus ("autofocus") mechanism to facilitate additional imaging functionality.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is described in conjunction with the appended figures.

FIGS. 8A-11B illustrate how the height of an object above the platen can be determined according to some embodiments of the invention.

DETAILED DESCRIPTION

Figure 1A:
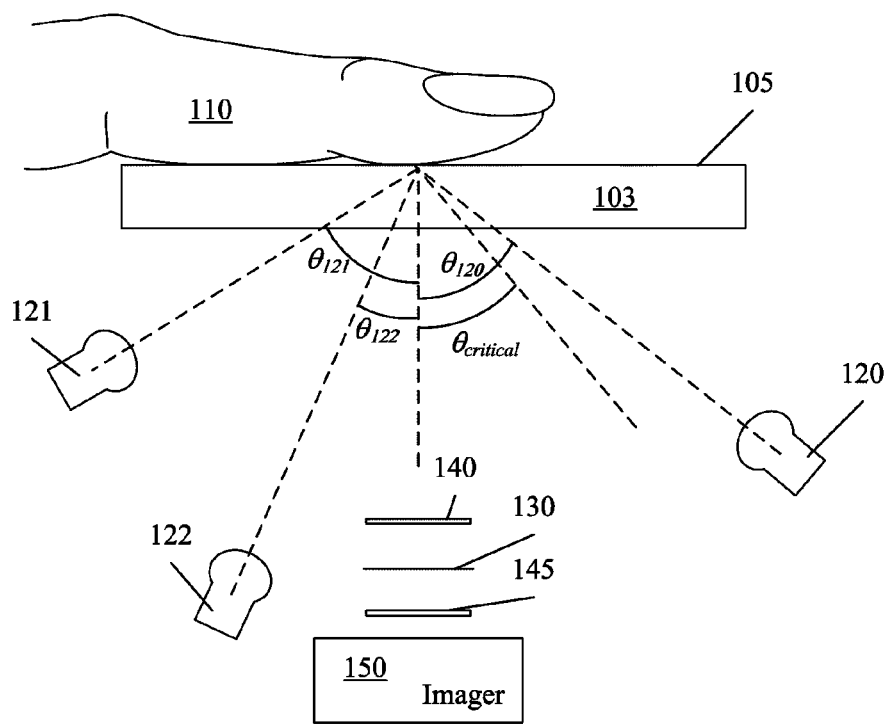
FIG. 1A shows a top view block diagram of a multiplexed biometric imaging system according to some embodiments of the invention.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Embodiments of the present invention provide improvements to biometric imaging and multispectral imaging systems, process, and/or techniques. These improvements can extend to other realms of endeavor.

Conventional optical fingerprint sensors acquire a single image of the fingerprint (or a set of images taken under substantially similar optical conditions) during a single measurement session. On the other hand, multispectral imagers acquire multiple images during a single measurement session under different optical conditions. Collecting such a set of images can require more acquisition time than collecting a single image. Embodiments of the invention provide methods and systems capable of solving this problem by acquiring multispectral images in a more efficient manner than with traditional serial acquisition; for example, by using multiplexed techniques.

In some cases, it is also desirable to initiate a fingerprint acquisition sequence automatically. Conventional optical sensors based on TIR imaging are often able to perform such a function by analyzing an image sequence and initiating an acquisition when a significant change in the image is detected. Such a method works because TIR imagers are substantially unable to view objects that are not in direct contact with the optical sensor and have certain other required characteristics. In contrast, direct imaging sensors such as multispectral fingerprint sensors are able to view the external environment and any nearby objects directly through the sensor surface. As such, direct imaging sensors see a finger that is in contact with the sensor as well as a finger that is nearby but not in contact with the sensor. The resulting image may be in focus or out of focus depending on the distance and the depth of field of the imaging system as well as the motion of the finger. In an effort to achieve maximum image quality, it is therefore often preferable to initiate a fingerprint image acquisition only after the finger is in firm contact with the sensor. Embodiments of the invention to solve this problem by providing a reliable means of making such determination using direct imaging are desirable.

Conventional optical fingerprint sensors typically incorporate a single TIR imager, which can require that a number of conditions be met to provide a good fingerprint image. These conditions can include the requirement that the fingerprint ridges are intact, clean, in optical contact with the sensor surface, and that the skin is of proper moisture content, i.e., neither too dry nor too wet. If any of these conditions aren't met, the resulting fingerprint image can be degraded or even missing entirely. However, when these conditions are met, the resulting image is generally of high quality and useful for both automated analysis and analysis by a human observer.

Multispectral fingerprint sensors and others based on direct imaging are able to acquire images under a much broader range of conditions of the skin, the local environment, and the nature of the interface between the skin and sensor. However, such images are generally of lower contrast than the corresponding TIR image, if the TIR image is of high quality. Some embodiments of the invention solve this problem by providing a fingerprint sensor that is able to collect both TIR and direct images during the same measurement session to ensure that biometric images are always collected regardless of the conditions of the finger, sensor surface and/or the local environment.

For purposes of this disclosure, the terms "finger," "fingerprint," and "fingerprint image" are meant to include sites and images collected from a single finger, multiple fingers, intermediate finger joints, the palm, the entire palmar surface of the hand, and/or any other skin site on the body, as well as other animate or inanimate objects such as documents, barcodes, credentials, and the like.

The terms "multispectral imaging," "MSI," and "multi-imaging" refer to methods and systems for acquiring multiple images of a finger during a single measurement session, wherein at least two of the multiple images are collected under different optical conditions. Different optical conditions may include, but not limited to, different illumination wavelengths, different illumination angles (both in azimuth and elevation and may include elevations on either side of the optical critical angle defined by the sensor imaging surface and the air or other surrounding medium), different illumination polarization conditions, different imaging angles (both in azimuth and elevation and may include elevations on either side of the optical critical angle defined by the sensor imaging surface and the air or other surrounding medium), different imaging focal planes, different imaging spatial resolutions, different imaging temporal resolutions, different imaging polarization conditions, and other such conditions that substantially alter the resulting images. Also, unless otherwise specified, the angle of incidence, angle of illumination, angle of imaging, etc. is measured relative to the normal of the incident surface.

Figure 24A:
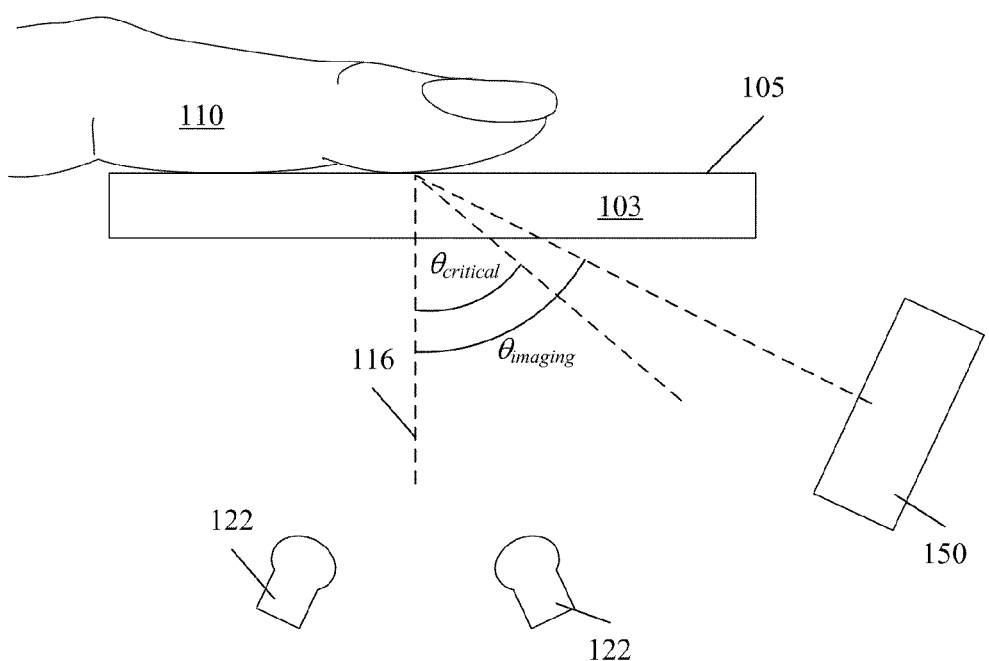
FIG. 24A shows an example of a TIR-imaging biometric sensor according to some embodiments of the invention.
Figure 24B:
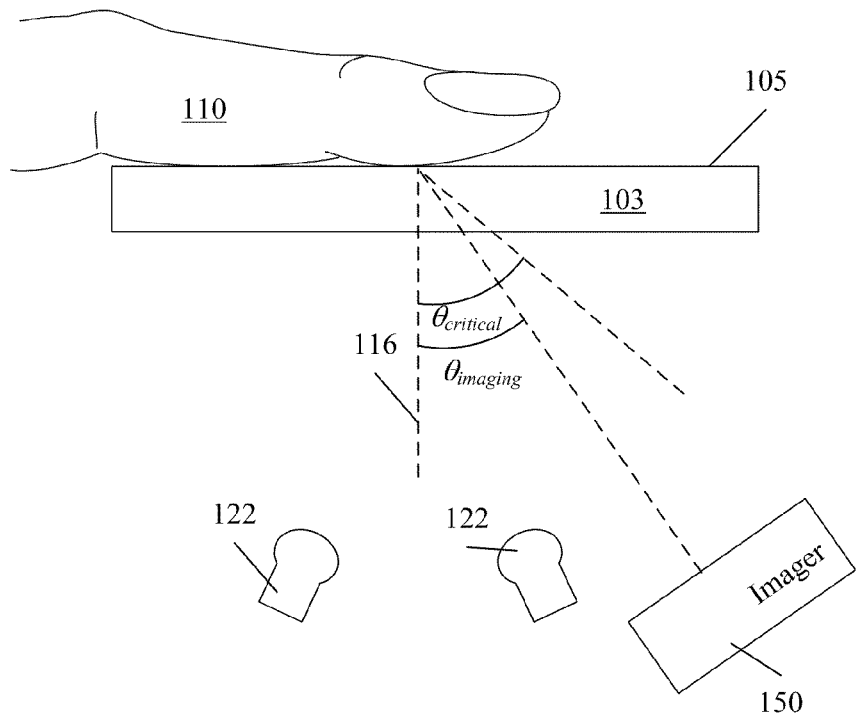
FIG. 24B shows an example of a direct-imaging biometric sensor according to some embodiments of the invention.

The terms "total internal reflectance imaging" and "TIR imaging" refer to a method of imaging known in the art wherein the optical axis of the imaging system lies at an angle relative to the normal of the sensor imaging surface and that is greater than the optical critical angle of that surface. A block diagram showing TIR imaging is shown in FIG. 24A. In this diagram, imager 150 images light from platen 105 at angle $\theta_{imaging}$ that is greater than the critical angle, $\theta_{critical}$, as measured from normal 116 of facet 105. This is TIR imaging. Illumination sources 122 can be positioned at various elevation and azimuth angles and. FIG. 24B shows imager 150 that images light from platen 105 at angle $\theta_{imaging}$ that is less than the critical angle, $\theta_{critical}$.

Figure 25A:
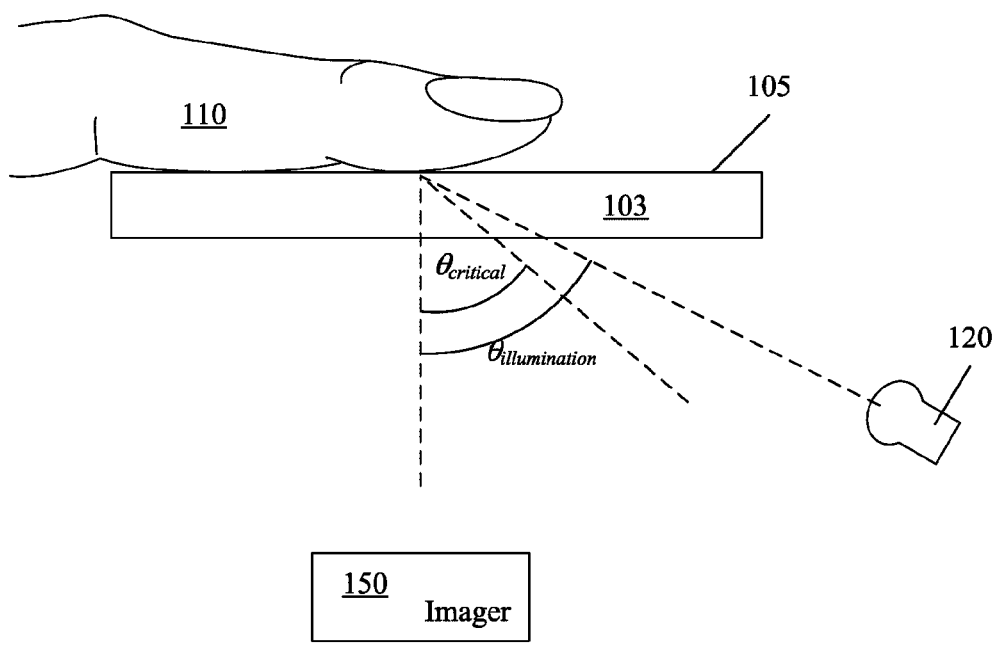
FIG. 25A shows an example of a TIR-illumination biometric sensor according to some embodiments of the invention.
Figure 25B:
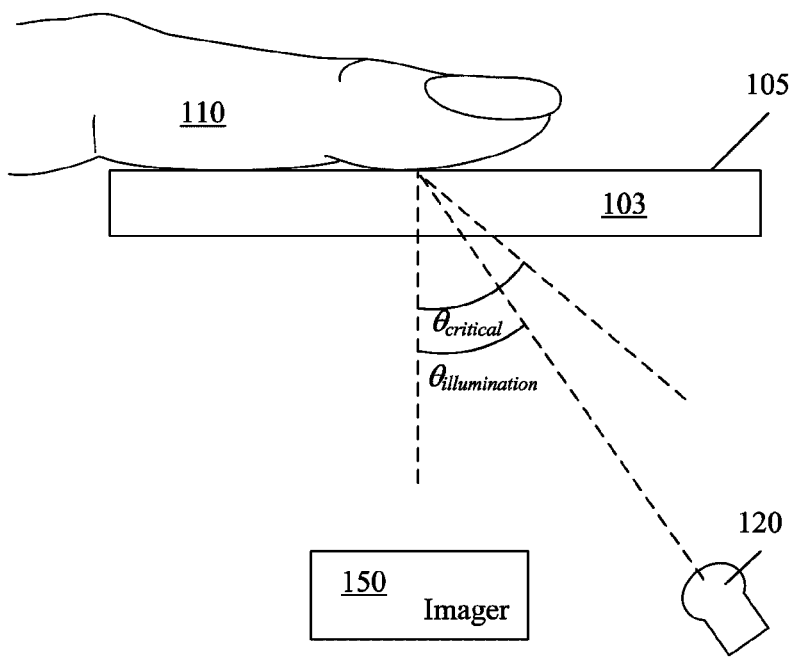
FIG. 25B shows an example of a direct-illumination biometric sensor according to some embodiments of the invention.

FIG. 25A illustrates TIR illumination. In this example, illumination source 120 illuminates platen 105 at an angle, $\theta_{illumination}$, that is greater than the critical angle, $\theta_{critical}$. FIG. 25B shows a non-TIR illumination system, with the illumination source 120 illuminating platen 105 at an angle, $\theta_{illumination}$, that is less than the critical angle, $\theta_{critical}$.

Various configurations of illumination and imaging are shown in FIGS. 24A-25B. Embodiments of the invention can incorporate any combination of TIR imaging, direct imaging, TIR illumination, and direct illumination. Moreover, multiple illumination sources and/or imagers can be at multiple angles of elevation and/or aziumuth.

The critical angle is a function of the index of refraction of the two media on either side of an interface and is approximately 42 degrees for a glass-air interface. Because the optical axis of the TIR imaging system lies beyond the critical angle of the sensor surface, the surface acts as a mirror (as seen by the imager) when untouched, and can cease to act as a mirror in those locations in which a material with suitable optical characteristics comes into direct contact with the sensor surface.

In locations where a finger or other material contacts a sensor surface, a new critical angle is established. However, for purposes of the present disclosure, the term "critical angle" will refer to the angle established by the sensor (i.e., the platen surface) and the surrounding environment, which is assumed to be air for most purposes. Also, as known in the art, light will change angles at boundaries between media due to phenomena such as refraction, reflection, diffraction and other such effects. When a ray angle is referred to in the present application as being greater than or less than the critical angle, for example, the statement refers to the angle of the ray at the operative boundary such as the sensor imaging surface rather than the angle of the same ray at any other boundary or media, unless explicitly stated as such.

The term "direct imaging" refers to a method of imaging wherein the optical axis of the imaging system lies at an angle relative to the sensor imaging surface that is less than the optical critical angle of that surface. For example, the system shown in FIG. 24B is one sample of a direct imaging system.

Figure 1B:
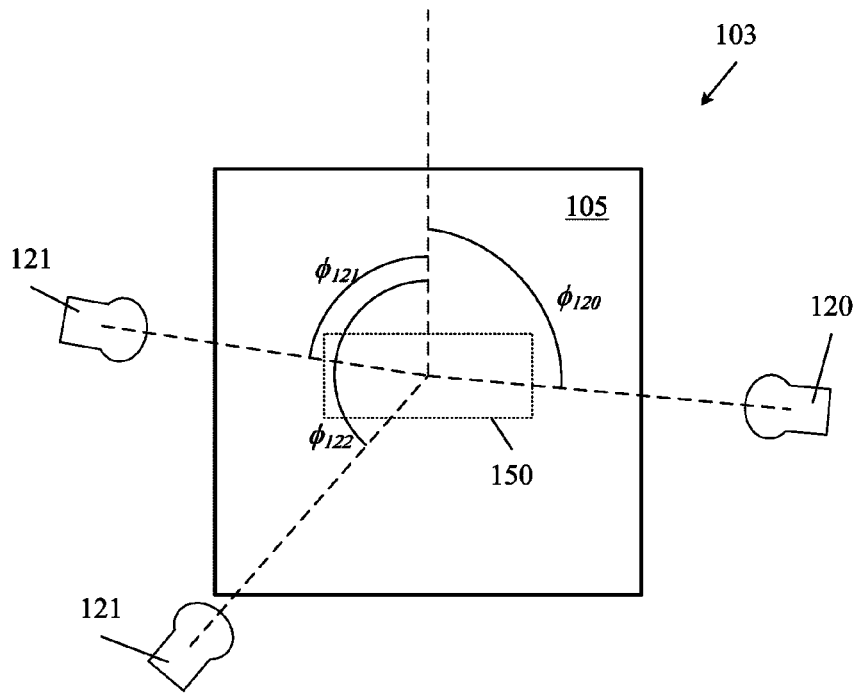
FIG. 1B shows a top view block diagram of a multiplexed biometric imaging system according to some embodiments of the invention.

FIGS. 1A and 1B are block diagrams of an imaging system according to some embodiments of the invention. FIG. 1A shows a side view of such a system with a direct imaging imager 150. That is, it images the platen at an angle less than the critical angle, $\theta_{critical}$, as measured from the normal. Multiple illumination sources 120, 121, and 122 are shown illuminating the platen at various angles $\theta_{120}$, $\theta_{121}$, and $\theta_{122}$. Note that angle $\theta_{122}$ is greater than the critical angle $\theta_{critical}$. FIG. 1B shows a top view of the imaging system shown in FIG. 1A; the finger is not shown for clarity purposes. Each illumination source 120, 121, and 122, illuminates the platen from different azimuth angles $\phi_{120}$, $\phi_{121}$, and $\phi_{122}$, relative to a portion of the platen.

Multiplexed Biometric Imaging

Multiplexed biometric imaging systems and methods are provided according to some embodiments of the invention. Multiplexed imaging systems can acquire images under different illumination conditions more efficiently than simply acquiring a sequence of image frames under each of the desired conditions. Such image data may be collected in a multiplexed manner. In some embodiments, the wavelength or spectral characteristics of an imaged object can be used to multiplex information from different illumination angles and/or optical polarizations together into a single image.

FIG. 1A shows a side view, block diagram of system that can be used for multiplexed biometric imaging according to some embodiments of the invention. FIG. 1B shows a side view. The system can include platen 103 that can be any number of shapes. Various polygonal-shaped platens are described later. The platen can include imaging surface 105, for example, where a purported skin site can be placed for imaging during a biometric acquisition. At imaging surface 105 finger 110 can be placed for imaging. While a finger is shown, any type of object can be imaged. These objects can include objects for biometric purposes such as hands, multiple fingers, faces, eyes, etc. And the objects can include money, documents, objects with codes or barcodes, etc.

Finger 110 can be illuminated using a plurality of illumination sources. Three illumination sources 120, 121, and 122 are shown in this embodiment. In some embodiments, only two illumination sources may be used. In others as many as four or five can be used. There is no limit on the number of sources that can be used. Each illumination source can illuminate imaging surface 105 at a different illumination angle relative to the normal of imaging surface 105. For instance, illumination source 120 illuminates imaging surface 105 at angle $\theta_{120}$, illumination source 121 illuminates imaging surface 105 at angle $\theta_{120}$, and illumination source 122 illuminates imaging surface 105 at angle $\theta_{122}$. Where $\theta_{120} \neq \theta_{121} \neq \theta_{122}$. These angles can be greater than or less than the critical angle at the interface near the platen as measured relative to the normal to the platen. And these angles can be called "elevation angles".

Furthermore, each of illumination sources 120, 121, and 122 are also placed at different azimuth angles $\phi_{120}$, $\phi_{121}$, and $\phi_{122}$ around a central portion of the platen. An azimuth angle can be measured from any arbitrary point. As shown in FIG. 1B, the azimuth angles are measured relative to a reference line perpendicular to the standard approach of a finger. In a system with four illumination sources, for example, a first illumination source can have an elevation angle of about 43° and an azimuth angle of about 12°. A second illumination source can have an elevation angle of about 46° and an azimuth angle of about 78°. A third illumination source can have an elevation angle of about 43° and an azimuth angle of about 168°. A fourth illumination source can have an elevation angle of about 46° and an azimuth angle of about 102°. In some embodiments, the azimuth angles relative to various illumination sources and/or imagers can be more important than the angle between the illumination sources and a reference line. The wavelength of the light provided by the illumination sources can vary tremendously.

Furthermore, illumination sources 120, 121, and 122 can each provide unique monochromatic light. For example, illumination source 120 can illuminate imaging surface 105 with blue light (e.g., 440-490 nm), illumination source can illuminate imaging surface 105 with green light (e.g., 520-570 nm), and illumination source 122 can illuminate imaging surface 105 with red light (e.g., 630-740 nm). Monochromatic light sources can provide light of single wavelength (e.g., a laser) or light within a narrow light band surrounding a single wavelength (e.g. LED or filtered broad-band source). In some embodiments, the light sources can provide light outside the visible spectrum in spectral regions that may include ultraviolet and/or infrared wavelengths. The main wavelength or wavelength band of light from each illumination source, in some embodiments, is different from the other sources. In the preceding example, each light source provides red, blue, or green light.

Illumination sources 120, 121, and 122 can include a quasi-monochromatic light sources having a narrow band of primary-color wavelengths. Illumination sources 120, 121, and 122 can also include LEDs, laser diodes, or lasers.

Imager 150 is used to image the light scattered and/or reflected from any object placed at imaging surface 105, such as finger 110. Imager 150 can be a color or black and white imager. Imager 150 can image an object through various optical elements 140 and 145, as well as through color filter array 130. Color filter array 130 can be integrated within imager 150 or be a stand alone element. Color filter array 130 is a mosaic of tiny color filters that separates the color response based on the arrangement of the mosaic. Various types of color filter arrays can be used such as, for example, a Bayer filter, a RGBE filter, a CYYM filter, a CYGM filter, or any type of RGBW filter.

Figures 4A, 4B:
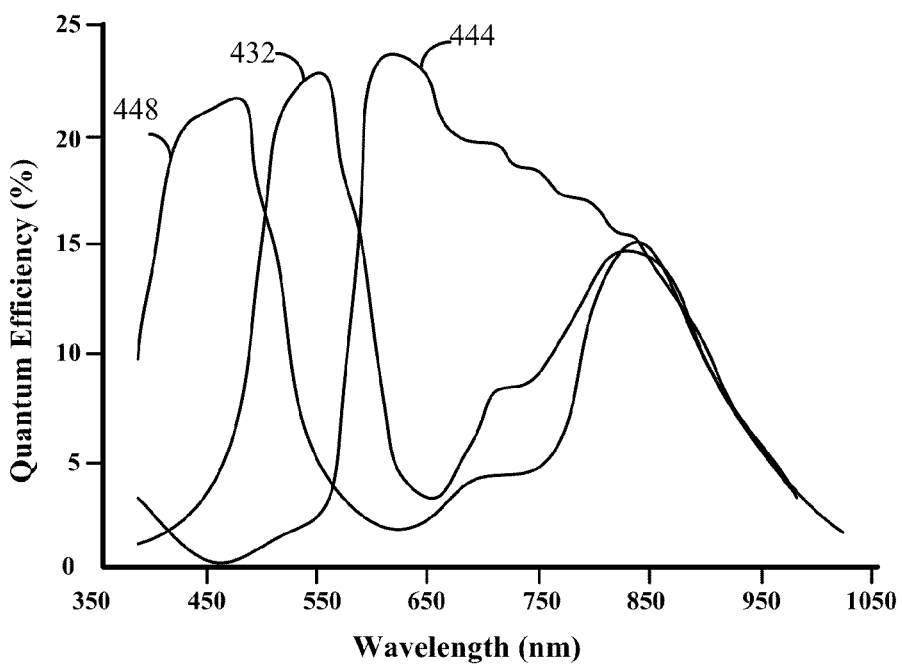
FIG. 4A shows an example of a color filter array according to some embodiments of the invention.
FIG. 4B shows the color response curve from a typical Bayer filter array.

An example of a Bayer color filter array is shown in FIG. 4A. This arrangement uses red 404, green 412, and blue 408 color filter elements. As seen from the color response curve for a typical Bayer filter array shown in FIG. 4B, there is generally some overlap in the spectral ranges of the red 424, green 432, and blue 428 transmission characteristics of the filter elements. As evident particularly in the curves for the green 432 and blue 428 transmission characteristics, the filter array may allow the transmission of infrared light. This can be avoided with the inclusion of an infrared filter as part of the imager. In other embodiments, an infrared filter may be omitted and one or more illumination sources that emit infrared light may be incorporated. In this way, all color filter elements 404, 408, and 412 may allow the light to substantially pass through, resulting in an infrared image at imager 150.

As an alternative to a color filter the imager or other optics may incorporate chromatic and/or polarizing beam splitters to separate the multiplexed light from the finger. The separated light may then be directed to individual monochromatic imagers where the number of imagers corresponds to the number of illumination conditions so separated.

Regardless of the type of color filter array that is used, in some embodiments, the wavelength of light provided by illumination sources 120, 121, and 122 should be aligned or closely aligned with the elements of the filter array. And, in some embodiments, the number of illumination sources can be, but not necessarily, aligned with the number of different filter elements in the array. For example, for a Bayer array, there are three filter colors. Hence, three illumination sources can be used. Each illumination source can then provide light in a red, blue, or green wavelength band to be consistent with the array.

Thus, imager 150 can create a multiplexed image of an object illuminated by multiple illumination sources arranged to illuminate light of different wavelengths at different illumination angles. This can be done during a single illumination session and, in some embodiments, a single image can be created. This single image can be considered a multiplexed image that can later be demultiplexed by color to provide information regarding the object that depends on the illumination angle of the illumination source. Furthermore, the multiplexed image can be considered a multispectral image because it contains information not only about the illumination wavelength but also the illumination angle.

In some embodiments, the illumination sources can include different polarization effects instead of or in addition to the differences in illumination angle. The resulting multiplexed image can then be a multispectral image that includes polarization information as well.

Figure 2:
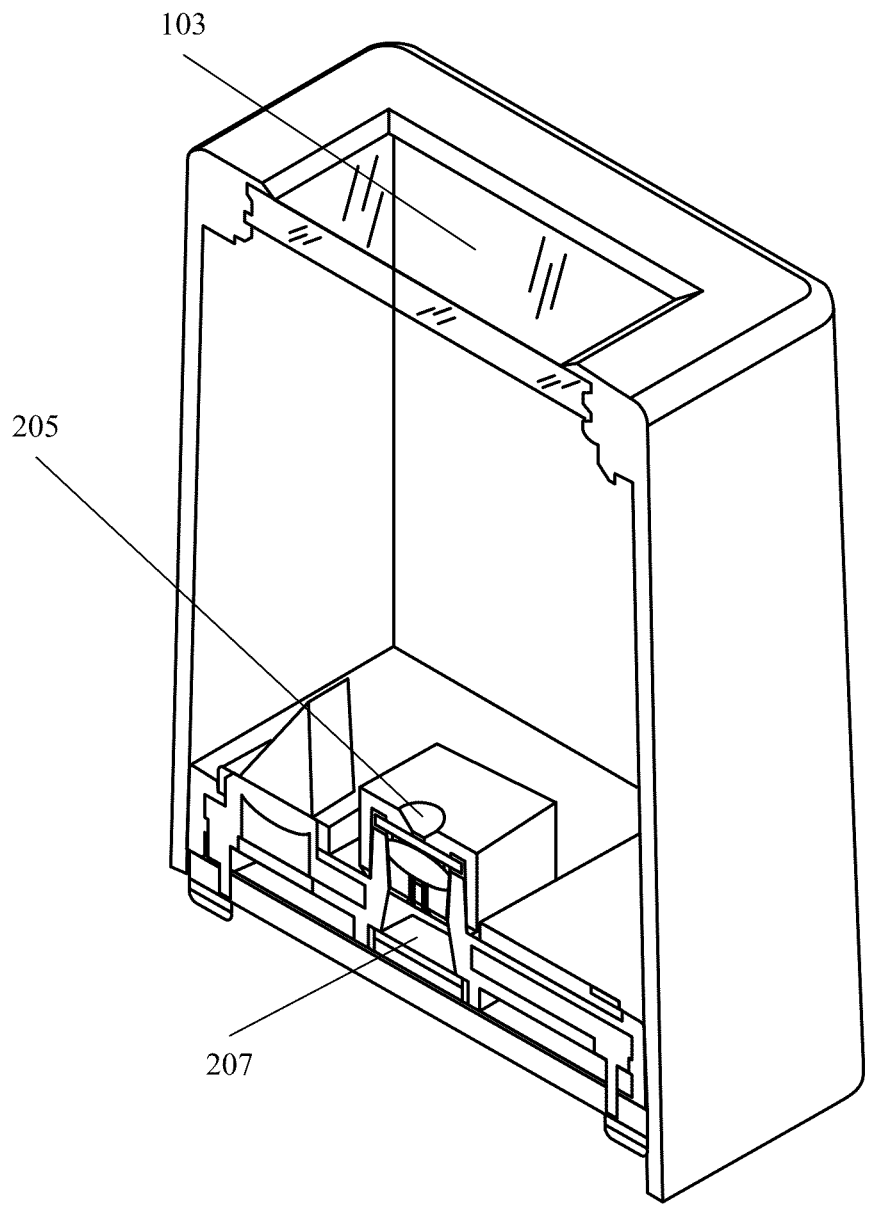
FIG. 2 is an example of a sensor with multiplexed image data using a color filter array according to some embodiments of the invention.

An example of a sensor with multiplexed image data using a color filter array is shown in FIG. 2. Platen 103 is provided and through which imaging optics 205 can image a finger (or an object) onto the imager 207. In some embodiments, imager 207 can be a silicon CMOS imager with an integrated Bayer filter. Other color filter arrays and/or other mean of separating the light (such as polarizing beam splitters or polarizing filter arrays), and/or other image array materials may be used alternatively or in conjunction with this arrangement. Moreover, various imagers can be used as well such as silicon CCD imagers or imagers made from other photoactive material such as InGaAs, InSb, MCT and others known in the art.

Figure 3:
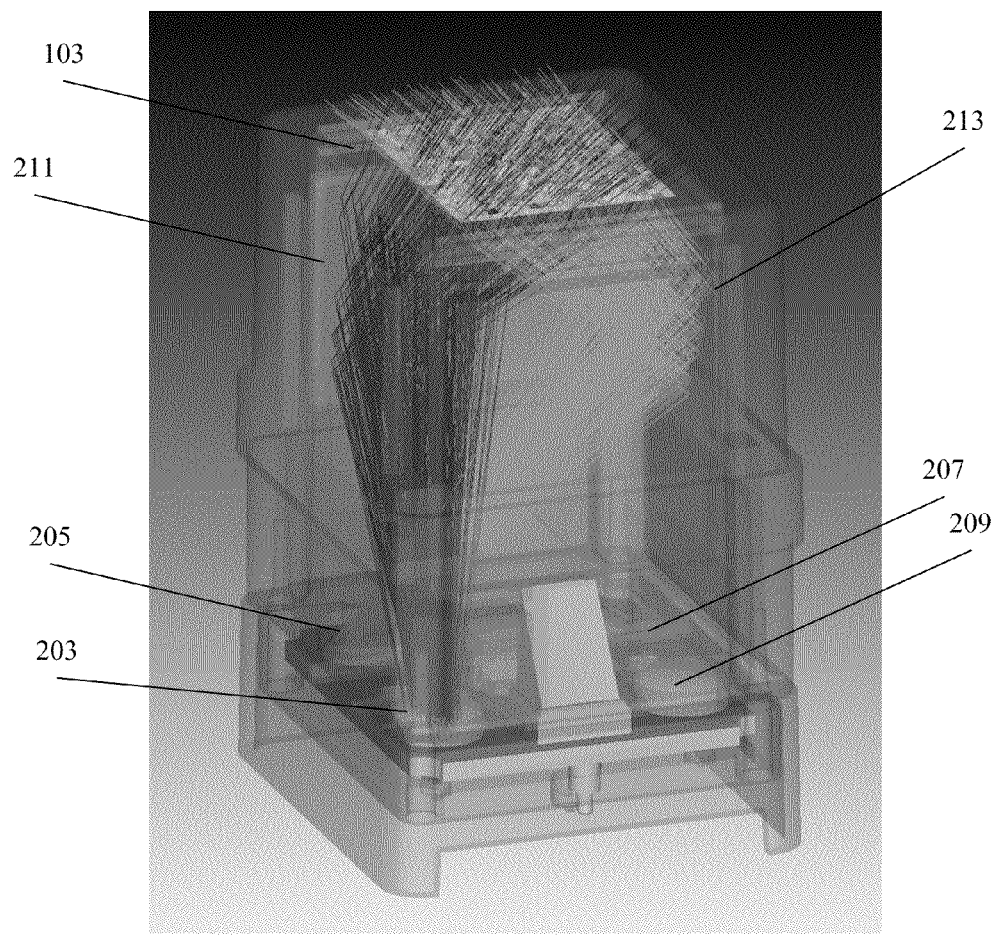
FIG. 3 is an example of a sensor with multiplexed image data using a color filter array according to some embodiments of the invention.

FIG. 3 shows another view of the sensor shown in FIG. 2 with two of the multiplexed illumination sources illustrated. In this embodiment, blue light source 203 (e.g., a blue LED, which may be combined with lenses, mirrors, optical diffusers and other components of the sort), and green light source 205 (e.g., a green LED, which may be combined with lenses, mirrors, optical diffusers and other components of the sort), are turned on simultaneously. The light traverses a path that illuminates platen 103 at two different angles. The light from light sources 203 and 205 are shown as being reflected from internal mirrored surfaces 211 and 213, respectively. The reflecting surfaces 211, 213 are used to increase the illumination angle (with respect to the platen surface normal) while maintaining a small sensor footprint. Once the light from light sources 203 and 205 illuminate and pass through platen 103, the light may illuminate a finger or another object from two angles simultaneously. An imaging system with a color filter array, like the one shown in FIG. 1A can then used to acquire a multiplexed image.

In addition to the two illuminators 203, 205, other illuminators 207, 209 could be used to provide for similar multiplexed illumination during earlier or later image frames. In addition, illuminators of colors other than the blue and green can be incorporated into other embodiments of the present invention. For example, a red illuminator in a different spatial and angular position from illuminators 203, 205 could be used.

Figure 5:
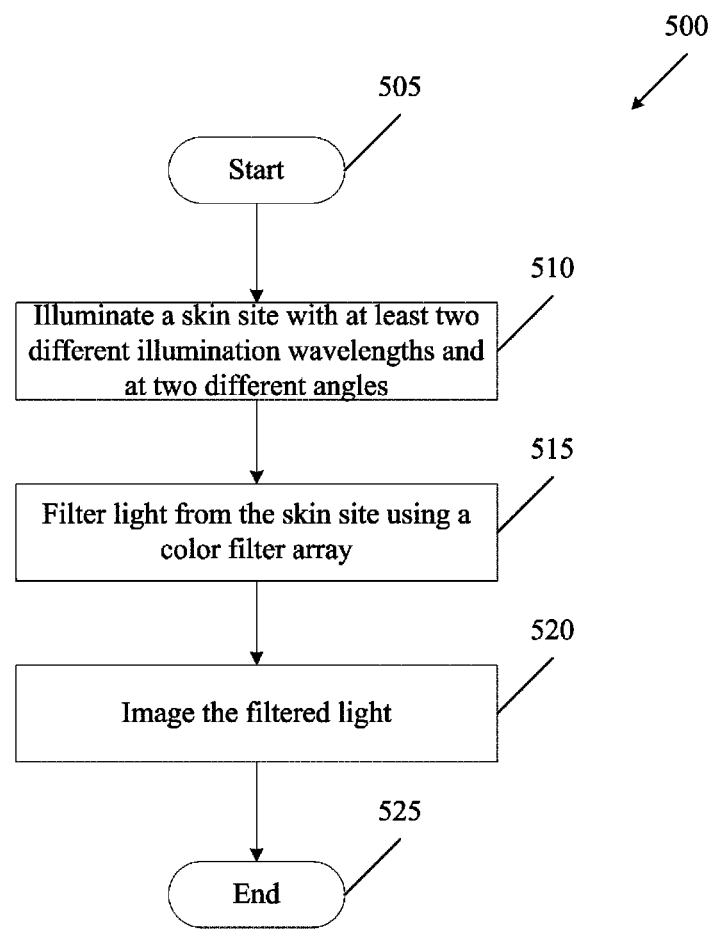
FIG. 5 shows a flow chart for creating a multiplexed image according to some embodiments of the invention.

FIG. 5 shows a flow chart of process 500 for creating a multiplexed image according to some embodiments of the invention. Process 500 starts at block 500. At block 510 a skin site is illuminated with at least two illumination sources having different wavelengths and illumination angles at block 510. The two illumination sources can illuminate the skin site at the same time or sequentially. In other embodiments, more than two illumination sources with different illumination wavelengths and different illumination angles can be used. At block 515, light from the skin site can be filtered using a color filter array of any type and then imaged at block 520. In some embodiments, a single multiplexed image can be acquired. Process 520 can end at block 525. Various post processing techniques can be used to pull out multispectral information from the multiplexed image. For example, the pixels corresponding to specific color filter mosaics may be separately extracted from the multiplexed image. Each of these images will then represent images collected under different illumination conditions (as well as different spectral conditions). These images may then be interpolated using linear or non-linear techniques to produce a uniform sampling of the object over the same grid.

Figure 15:
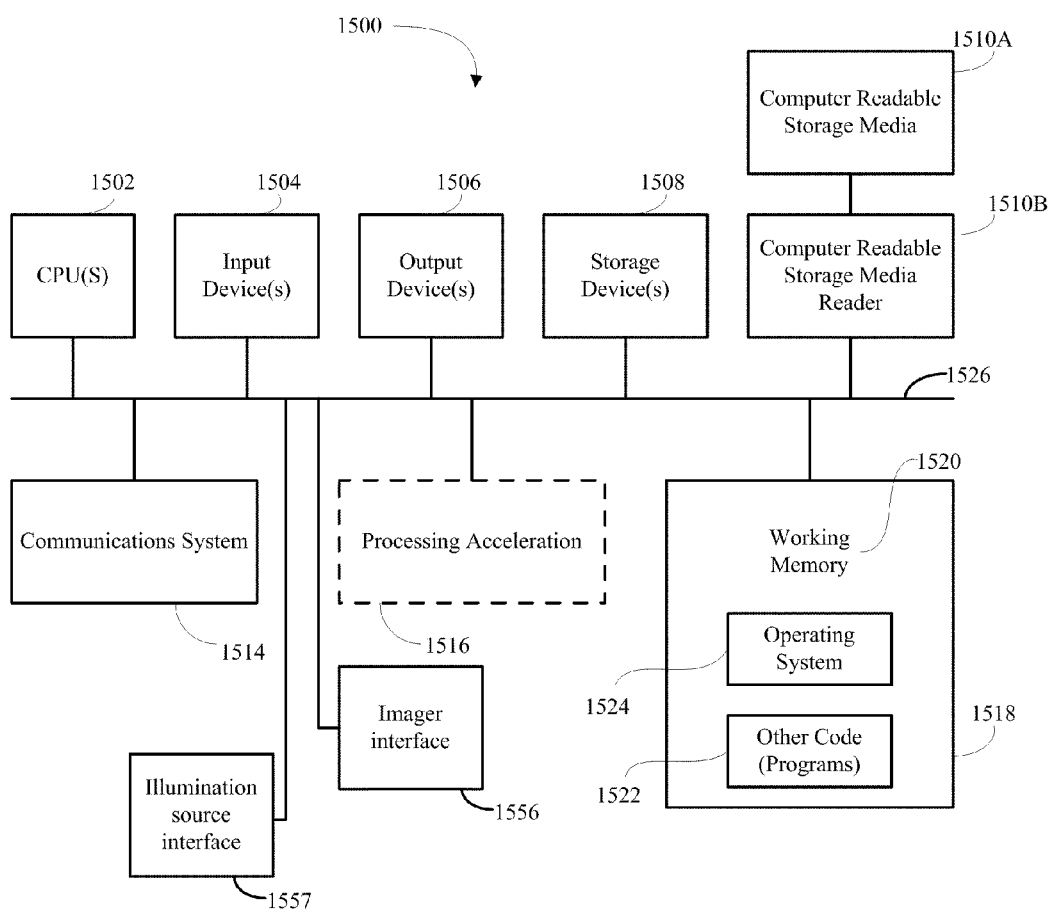
FIG. 15 shows a block diagram of a computational system that can be used in conjunction with various other embodiments of the invention.

Process 500, for example, can be executed by the computational device shown in FIG. 15.

Presence and Object Detection

Figure 6:
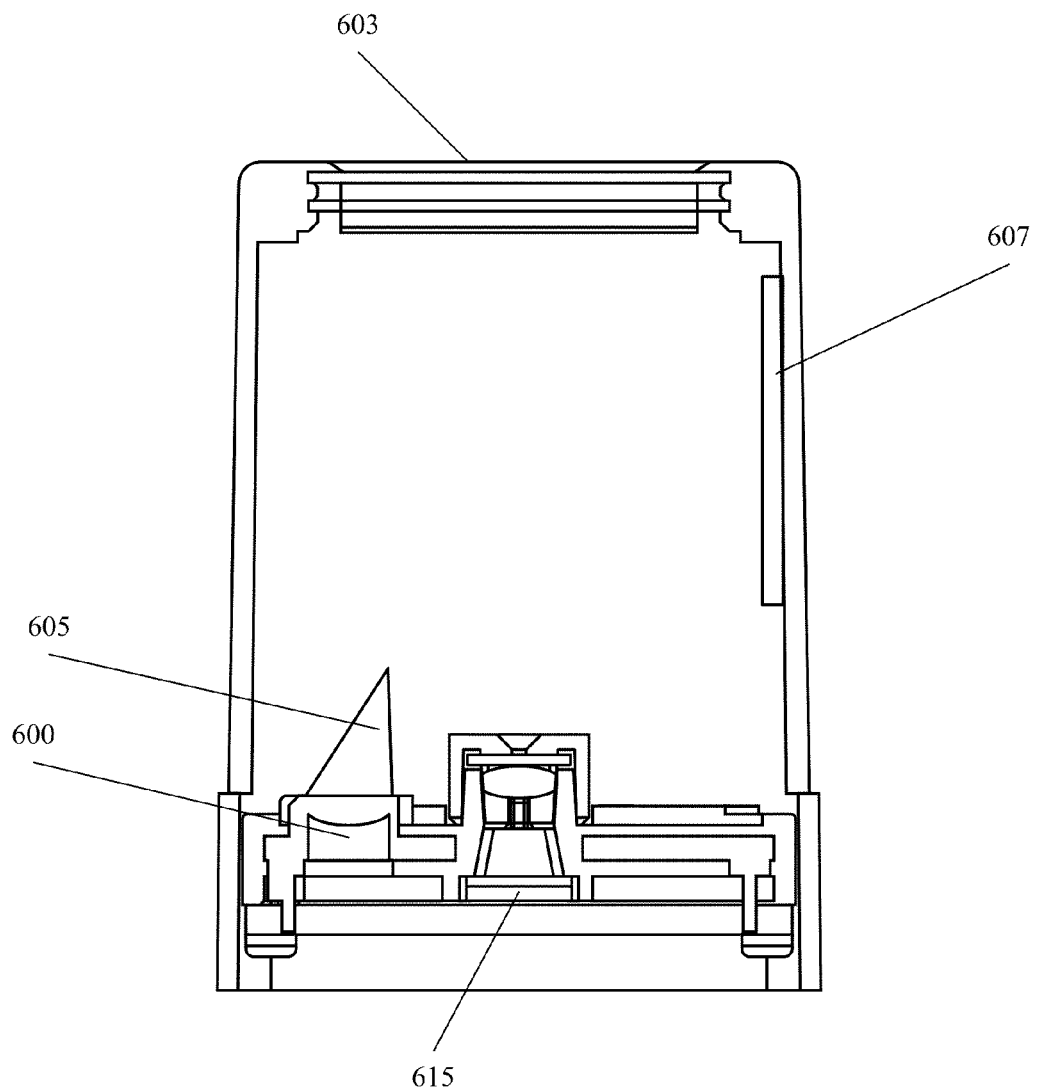
FIG. 6 illustrates an optical system that can be used to detect the presence of an object at a platen according to some embodiments of the invention.

Some embodiments of the invention can be used to detect the presence and/or location of an object prior to imaging. FIG. 6 illustrates an optical system that can be used to detect the presence of an object at a platen. Illumination system 600 can include an illumination source (e.g., LED, laser, etc.) and illumination optics (e.g., cylindrical lens, spherical lens, mirrors, and/or other such optical components). The illumination source can be a monochromatic source. For example, a red, blue or green monochromatic source can be used. In some embodiments, illumination assembly 603 can direct light into a beam steering component 605, which directs the light toward mirrored surface 607 and then on and through platen 603. Imager 615 can be used to take video or sequential images of an area on or above platen 603. Imager 615 can include a color filter array. And, in some embodiments, a pixel (or mosaic) of the color filter array can be substantially the same as or consistent with the wavelength of one or more of illumination source (e.g., illumination system 600). The path of the illumination light 703 is illustrated in FIG. 7.

Figure 7:
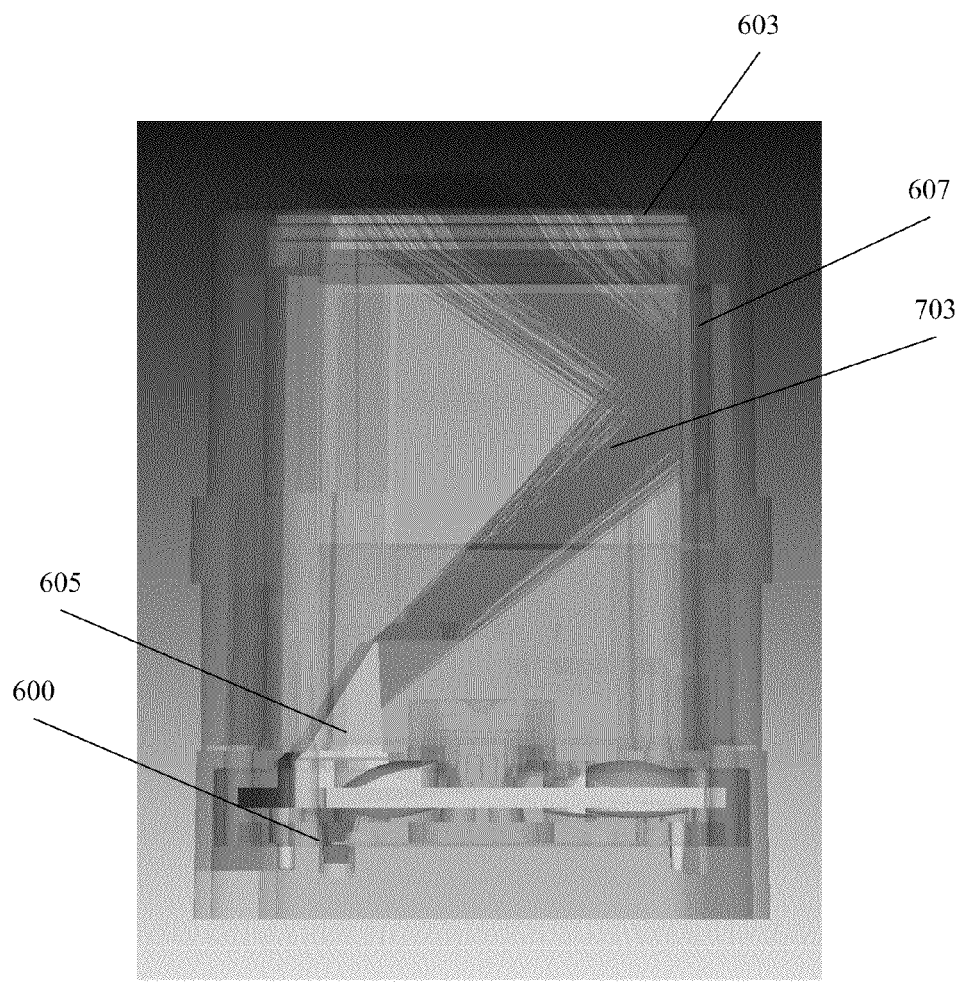
FIG. 7 shows an optical system and optical paths according to some embodiments of the invention.

In FIG. 7, illumination light 703 illuminates a distinct region of platen 603. In some embodiments and as shown in the figure, illumination light 703 illuminates platen 103 with a steep illumination exit angle relative to the normal of the platen surface. In so doing, the distinct pattern can appear at different locations in the image based on the height of the finger or other object above the platen. Mirrored surface 607 can be used to provide this steep illumination exit angle relative to the air above the platen without sacrificing a compact design. For example, the exit angle of illumination (above the platen as the light exits the platen) can be any exit angle that is not perpendicular to the surface of the platen. For example, the exit angle ($\theta$) can be about 51° (±10°) from the normal of the platen. In other embodiments, the exit angle can be any angle from 40° to as close to parallel to the platen as practical (i.e. 90°). For example, the angle of illumination can be 40°, 45°, 50°, 55°, 60°, 65°, 70°, 75°, 80°, 85°.

FIGS. 8A-11B illustrate how the height of an object above the platen can be determined according to some embodiments of the invention. For simplicity refraction effects as light enters and exits the platen are ignored. If the refraction effects were shown, the light exiting the platen would have a larger exit angle, $\theta$, than shown. This exit angle, $\theta$, can be any angle described in the preceding paragraph. In FIG. 8A finger 805 is positioned well above platen 803. Imager 815 is used to image the finger. Imager 815 can include a color filter array. Illumination source 800 illuminates the platen surface and the area near the platen surface. Light rays from illumination source 800 can be confined within strip 820. The illumination exit angle of illumination source 800 can be steep relative to the normal of the platen surface. As finger 805 approaches platen 803, a portion of the finger is illuminated as shown in FIG. 8A. FIG. 8B shows a block illustration of image 830 produced by imager 815. Illumination pattern 835 is formed from the light scattered from finger 805. The position of illumination pattern 805 can indicate the position of the finger relative to the platen. In FIG. 8B illumination pattern is located at the far right of the image indicating a position of finger 805 well above platen 803.

FIG. 9A shows finger 805 positioned closer to platen 803 a moment after the finger's position in FIG. 8A. And FIG. 9B shows image 830 of finger 805 with illumination pattern 835 moved toward the left to coincide with the movement of the finger. FIG. 10A shows finger 805 positioned even closer to platen 803 a moment after the finger's position in FIG. 9A. And FIG. 10B shows image 830 of finger 805 with illumination pattern 835 moved toward the left to coincide with the location of the finger. Finally, FIG. 11A shows finger 805 in contact with platen 803 a moment after the finger's position in FIG. 10A. And FIG. 11B shows image 830 of finger 805 with illumination pattern 835 moved toward the left. Thus, by monitoring the position of illumination pattern 835 in sequential images the position of finger 805 can be determined relative to platen 803. As can be seen from these figures, the steepness of the illumination exit angle in the air above the platen determines the relationship between the height of the finger 805 relative to the platen 803 and the position of the illumination pattern 835 in the image 830. If the illumination exit angle is steeper (closer to 90 degrees) the position of the illumination pattern 835 will change faster as a function of the finger 805 height above the platen 803.

Figure 12:
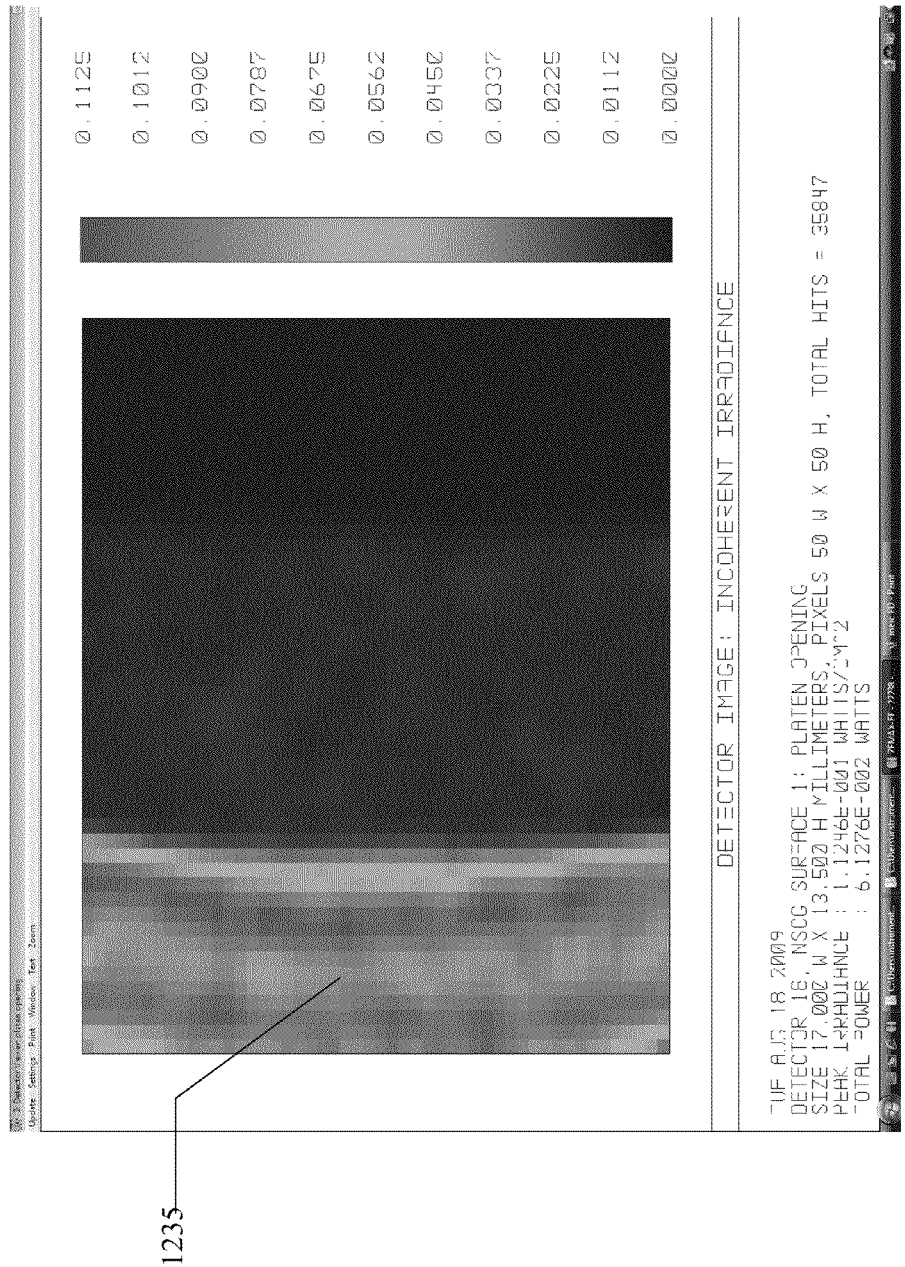
FIG. 12 shows an actual image that results when the finger or other object surface is located about 5 mm above the surface of a platen using embodiments of the invention.
Figure 13:
FIG. 13 shows an actual image that results when the finger or other object surface is located at the surface of a platen using embodiments of the invention.

FIG. 12 shows an actual image that results when the finger or other object surface is located about 5 mm above the surface of a platen. As can be seen from the image, the illuminated pattern 1235 is located toward the left side of the image. FIG. 13 shows another actual image that results when a finger or other object surface is located on the platen. With the finger on the platen, illumination pattern 1335 is centrally located on the image, while illumination pattern 1235 is located on the side of the image. The horizontal shift between illumination patterns is due to the steep exit angle of the illumination beam.

In some embodiments, the intensity profile of the illumination pattern changes as the finger approaches the platen. Because of the exit angle of illumination and the rounded cross-sectional shape of a finger, while the finger is above the platen the intensity profile will be sharper on one side of the finger and more gradual on the other. As the finger moves closer the intensity profile becomes more and more symmetric. In some embodiments, this intensity profile can be used as further evidence of the position of the finger. Other information such as the spectral content, the shape, and the position can be used to determine the location and the object type. For example, the width of the illumination pattern may widen as the finger approaches the platen.

A video sequence of images can be acquired and analyzed to determine the location of the illumination pattern. If the illumination pattern is not located in the proper location then another image can be collected and/or analyzed until the illumination pattern is in the proper location. Once in the proper location, biometric imaging or other processes may begin that require the object to be in a certain location.

In some embodiments, the shape of illumination pattern can indicate the type of object being imaged. For example, in FIGS. 12 and 13, a finger was imaged resulting in an illumination pattern resembling a slightly bowed rectangle. And the center of the platen image is brightly illuminated (shown by the red color) while the light intensity falls off on either side (blue). Thus, both the geometrical shape and the intensity of the illumination can be indicative of the object under illumination. This illumination pattern may depend on the illumination angle and/or the type of object being imaged. By fixing the illumination angle and calibrating the system with the illumination angle fixed, the illumination pattern may then depend on the object type. Images can be acquired in sequential order and the illumination pattern can be analyzed.

In biometric imaging of fingerprints, for example, if the illumination pattern is inconsistent with the known illumination pattern of a finger, then it can be determined that a foreign object is being placed on the platen and biometric imaging should not start. If the illumination pattern is consistent with the known illumination pattern of a finger, then it can be determined that a finger is being placed on the platen and biometric imaging can begin. This technique can be used in conjunction with the presence detection techniques to determine when the finger is in contact with the platen prior to triggering the start of biometric imaging.

Various other objects can have correspondingly unique illumination patterns that can be used. The particular illumination pattern is not critical, as long as it is easily recognized and distinct from objects in the background. In order to achieve this, the shape of the illumination pattern may be altered using appropriate optics in the illumination assembly as well as elsewhere along the optical path.

In addition, the spectral properties of the illumination pattern may be distinguished from background materials and/or ambient lighting conditions ("background noise"). For example, the illumination source can be a blue LED that emits light strongly detected by the blue pixels of a color filter array and weakly detected by the other pixels of the color filter array used in the imager. The illumination pattern can then be analyzed. And if it is determined that there illumination pattern provides a strong signal in the blue pixels and a weak signal in the other pixels, then the illumination pattern can safely be determined to not be background noise. If, however, the blue pixels do not register a strong signal relative to the other pixels, then the illumination pattern is likely a background and can be ignored. While this example uses a blue LED relative to blue pixels, other wavelengths can be used.

Using various embodiments described herein sequential images of the skin site can be acquired while being illuminated with a single illumination source having a steep illumination angle. Prior to operating a function that requires the presence of a specific type of object at a platen for imaging, such as in biometric imaging or multispectral imaging, the following can occur in any order and with or without any one step:
1. Analyzing the illumination pattern to ensure that the shape of the illumination pattern is consistent with the shape of the expected object.
2. Analyzing the location of the illumination pattern to determine if it's location is consistent with the expected object being in contact with the platen. The illumination pattern can include the geometric pattern and/or the intensity profile.
3. Analyzing the illumination pattern to determine if it has a strong signal for the pixels that are consistent with the wavelength of the illumination source and/or determine if the illumination pattern has a weak signal for pixels not consistent with the wavelength of the illumination source.

Figure 14:
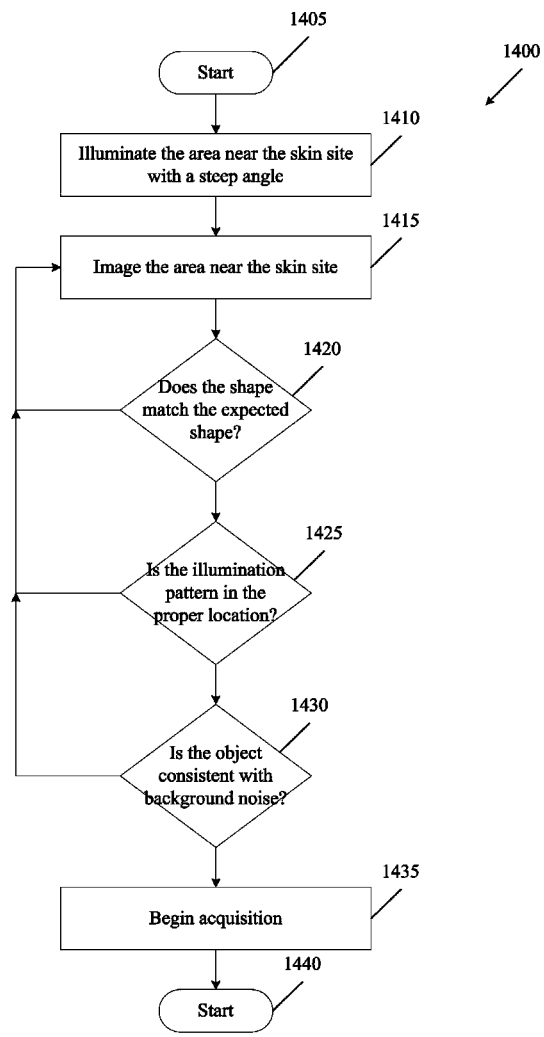
FIG. 14 shows a flowchart for determining whether to image an object present at or near the platen according to some embodiments of the invention.

FIG. 14 shows a flowchart outlining process 1400 for determining whether to image an object present at or near the platen according to some embodiments of the invention. Process 1400 starts at block 1405. At block 1410 the imaging surface and/or the area nearby the imaging surface is illuminated. In some embodiments, this illumination can occur at a steep angle relative to the normal. In some embodiments, this illumination can occur using a monochromatic light source. The wavelength of this monochromatic light source, for example, can be matched with one of the pixels and/or mosaics of a color filter array of the imager.

At block 1415 the area near the imaging surface is imaged. At block 1420 the image is analyzed to determine if the shape of the illumination pattern is consistent with the expected object. This illumination pattern may be a geometric illumination pattern and/or an intensity pattern. If the illumination patter is inconsistent with the expected pattern, then process 600 returns to block 1415 and another image is acquired. In some embodiments, process 600 pauses a short time period prior to returning to block 1410. If the pattern is consistent with the expected object, then process 1400 proceeds to block 1425.

At block 1425 process 1400 determines whether the illumination pattern is formed in a location consistent with the expect object being placed on the platen. If the location is inconsistent, then process 1400 returns to block 1415 and another image is acquired. If it is consistent, then process 1400 proceeds to block 1430. At block 1430 process 1400 determines whether the illumination pattern is consistent with background noise. This can be done by analyzing the pixels of the image in conjunction with the color filter array. If the pixels within the illumination pattern are strongly associated with light illumination wavelength and/or weakly associated with light associated with other pixels, then the object is not a background object and process 1400 proceeds to 1435. Otherwise process 1400 returns back to block 1415. At block 1435 imaging or other tests or measurements can occur once it is determined that the proper object is placed in the proper location and is not background noise. Process 1400 ends at block 1440.

Process 1400, for example, can be executed by the computational device shown in FIG. 15.

Computational Device

FIG. 15 shows a block diagram of computational unit 1500 that can be used inc conjunction or as part of a biometric sensor system. The figure broadly illustrates how individual system elements may be implemented in a separated or more integrated manner. Moreover, the drawing also illustrates how each of the four imagers 1510 may include a dedicated processor 1515 and/or dedicated memory 1520. Each dedicated memory 1520 may include operational programs, data processing programs, instructions for carrying out methods described herein, and/or image processing programs operable on the dedicated processors 1515. For example, the dedicated memory 1520 may include programs that can be executed by CPU 1502 and/or provide image processing. The computational device is shown comprised of hardware elements that are electrically coupled via bus 1530. The bus 1530, depending on the configuration, may also be coupled with the one or more LED(s) 1505, a proximity sensor (or presence sensor) 1512 and four imaging subsystems 1504 according to various embodiments. In another embodiment, imager memory 1520 may be shared amongst imagers 1515 and/or with the computational device 1502.

In such embodiments, an imaging subsystem may include an imager 1510, a processor 1515, and memory 1520. In other embodiments, an imaging subsystem 1504 may also include light sources and/or optical elements. Imaging subsystems 1504 may be modular and additional imaging subsystems may be easily added to the system. Thus, biometric sensor subsystems may include any number of imaging subsystems 1504. The various imaging subsystems, in one embodiment, may be spatially modular in that each imaging subsystem is used to image a different spatial location. The various imaging subsystems, in another embodiment, may be multispectrally modular in that each imaging subsystem is used to image a different multispectral condition. Accordingly, in such an embodiment, an imaging subsystem 1504 may also include various optical elements such as, for example, color filter arrays, color filters, polarizers, etc and/or the imager 1510 may be placed at various angles relative to the imaging location. The various imaging subsystems, in another embodiment, may provide focus modularity in that each imaging subsystem is used to image a different focal point or focal plane.

The hardware elements may include a central processing unit (CPU) 1550, an input/output device(s) 1535, a storage device 1555, a computer-readable storage 1540, a network interface card (NIC) 1545, a processing acceleration unit 1548 such as a DSP or special-purpose processor, and a memory 1560. The computer-readable storage 1540 may include a computer-readable storage medium and a computer readable medium reader, the combination comprehensively representing remote, local, fixed, and/or removable storage devices plus storage media for temporarily and/or more permanently containing computer-readable information. The NIC 1545 may comprise a wired, wireless, modem, and/or other type of interfacing connection and permits data to be exchanged with external devices.

Moreover, computational unit can include illumination source interface 1557 and/or imager interface 1556. These interfaces can be standard input/output interfaces such USB, firewire, UART, RS232 or a proprietary interface. Regardless of the communication protocols, imager interface 1556 can be used to instruct the imager (e.g., any of the imagers or sensors described herein) to acquire an image and/or export an image. Illumination source interface 1557 can be use to activate and/or deactivate any of a plurality of illumination sources singularly, as a group, or sequentially.

The computational unit 1500 may also comprises software elements, shown as being currently located within working memory 1560, including an operating system 1565 and other programs and/or code 1570, such as a program or programs designed to implement methods described herein. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Computational unit 1500 can be used to carry out processes shown in any of the figures and described in the specification. Specific instructions and/or program code can also be stored in memory 1518 or 1512 and executed by CPU 1502.

Dual-Imager Biometric Sensor

Embodiments of the invention may include systems, methods, and devices that may collect images of the finger using two different types of imagers that acquire images of the finger during the same measurement session. In some cases, the imagers may acquire images simultaneously. In some cases the imagers may acquire two video sequences wherein the frames of the video sequences are synchronized such that the two sequences are substantially temporally aligned to aid processing in the presence of motion of the finger or other object being imaged. In some embodiments, the two imagers may comprise a TIR imaging system and/or a direct imaging system. In some embodiments either or both the imaging systems may be multispectral imaging systems.

In some embodiments of the invention a prism with multiple facets can be used with facets arranged for simultaneous direct and TIR imaging of a skin site. The prism can be used in conjunction with one or more illumination sources and/or one or more imagers. A first facet of the prism may be adapted for placement of a purported skin site by an individual. The first facet may include an imaging surface for placement of the purported skin site. The first facet or just the imaging surface of the first facet may alternatively be referred to as a "platen". A second facet may be oriented with respect to the first facet such that a portion of light totally internally reflected at the first facet substantially passes through the second facet. The sensor may include one or more illumination sources disposed to illuminate the imaging surface of the prism and/or the purported skin site through the first facet of the prism. The sensor may include a direct imaging assembly disposed to receive light scattered from the purported skin site and reflected from the second facet of the prism. The sensor may include a total-internal-reflectance imaging assembly disposed to receive light scattered beneath a surface of the purported skin site at the first facet and substantially passes through a third facet of the prism.

Figure 16:
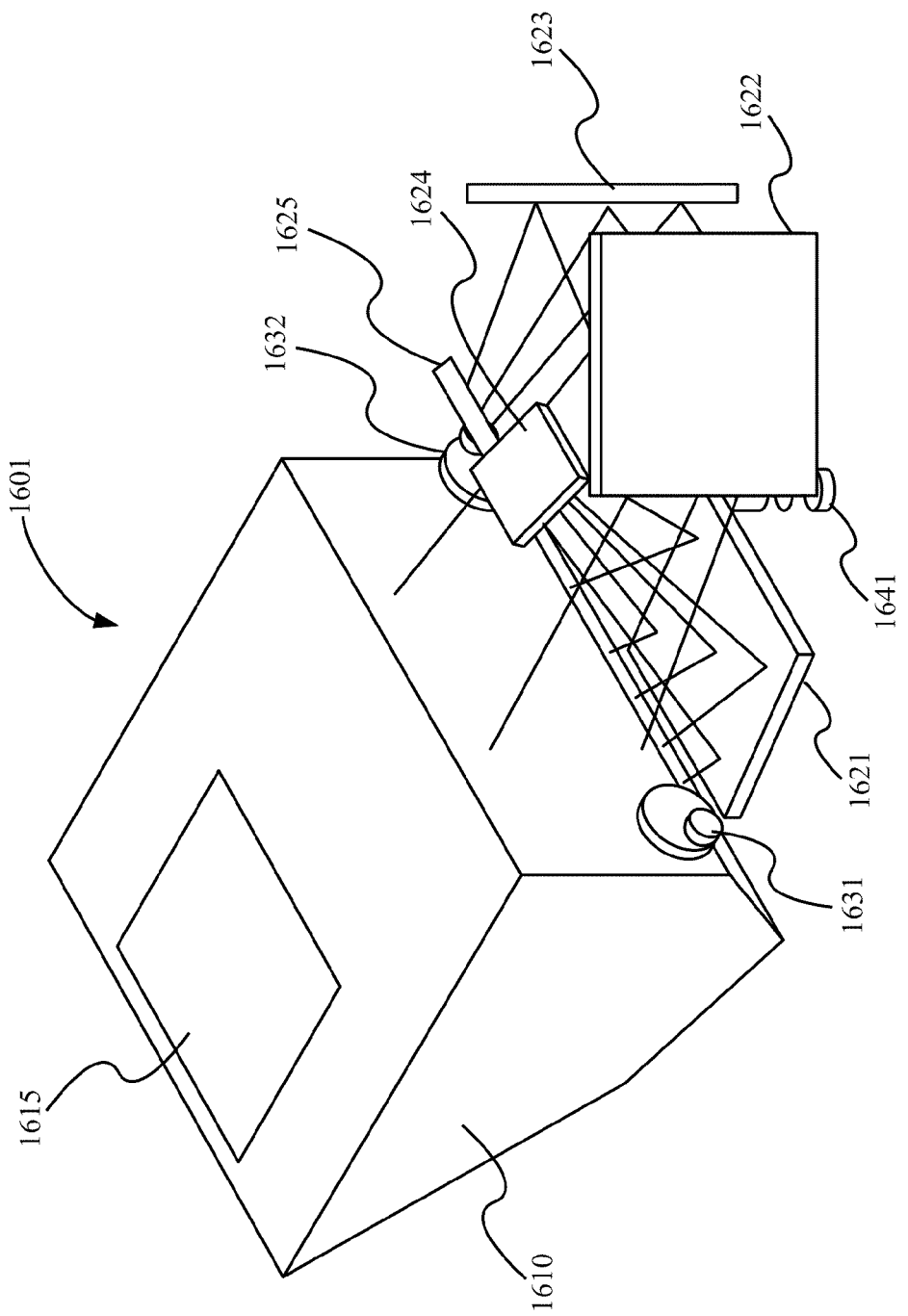
FIG. 16 provides an isometric view of a dual-imager biometric sensor, in accordance with various embodiments.
Figure 21:
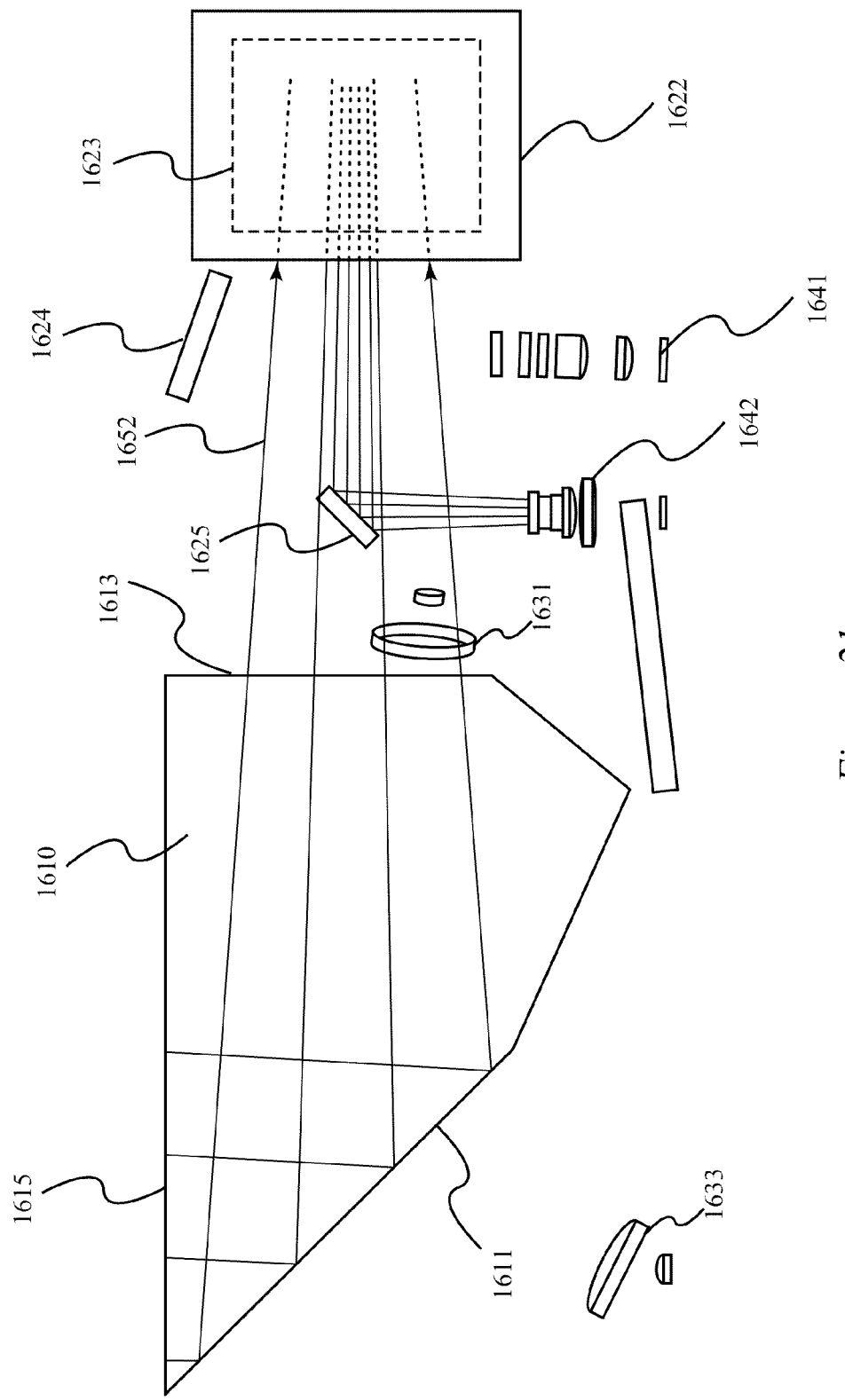
FIG. 21 depicts a direct imaging ray bundle within a dual-imager biometric sensor, in accordance with various embodiments.

FIG. 16 shows an isometric view of dual-imager biometric sensor 1601 according to some embodiments of the invention. Sensor 1601 includes prism 1610 and further designates a region of the platen that is the active image surface 1615 used to image the finger or other object; active image surface 1615 may be referred to as a platen or as a facet of prism 1610. In some embodiments, prism 1610 may include multiple facets. A dual-imager biometric sensor may include one or more illumination sources. For example, dual imager sensor 1601 includes two illumination sources 1631 and 1632. A dual imager sensor may include other components, such as reflective surface like mirrors 1621, 1622, 1623, 1624, and/or 1625, which may be used to facilitate directing light to different imaging components. A dual imaging sensor may also include one or more total-internal-reflectance imaging assemblies. FIG. 21 for example shows TIR imaging assembly 1641. A dual imaging biometric sensor may also include a direct imaging assembly 1642.

Figure 17:
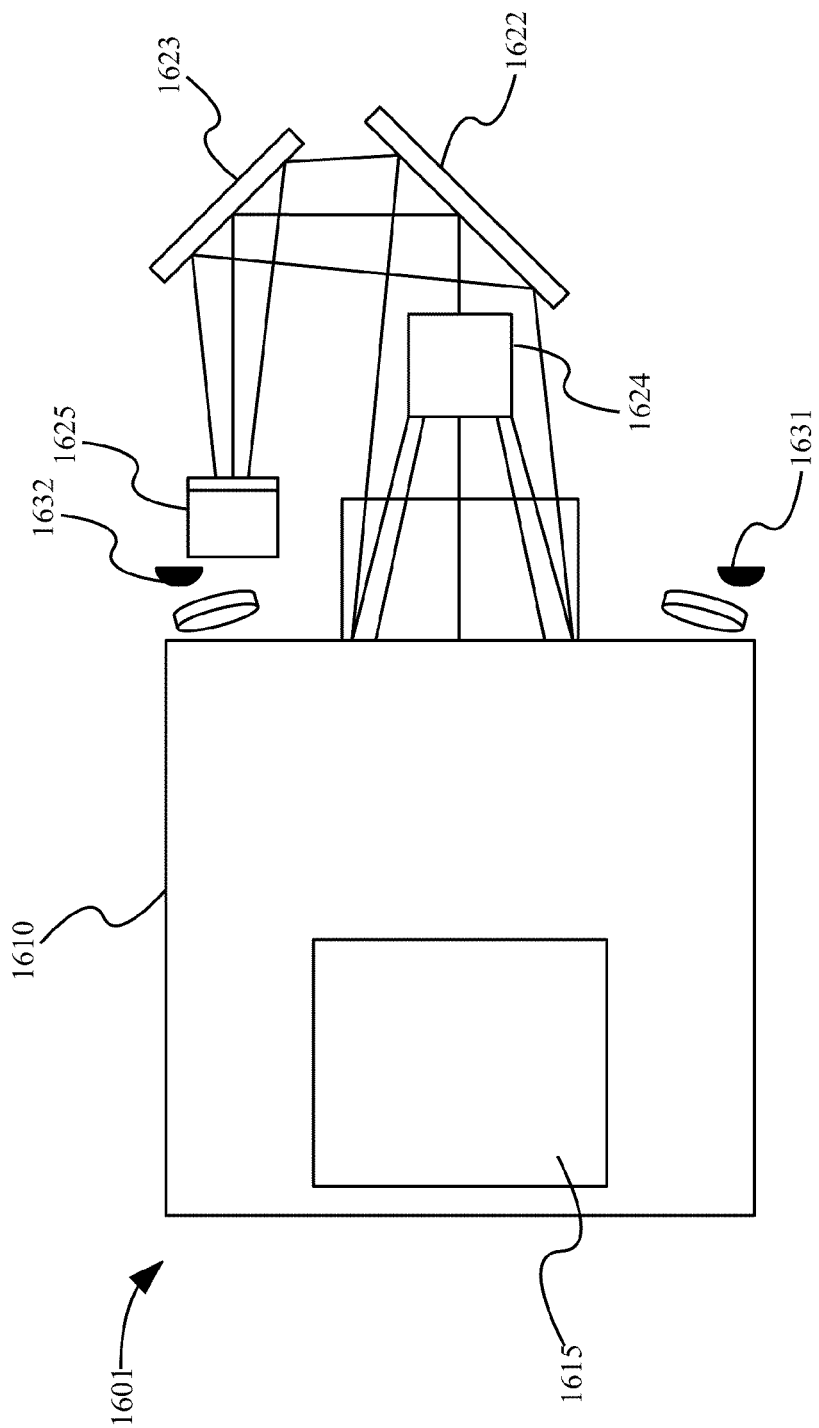
FIG. 17 provides a top view of a dual-imager biometric sensor, in accordance with various embodiments.
Figure 18:
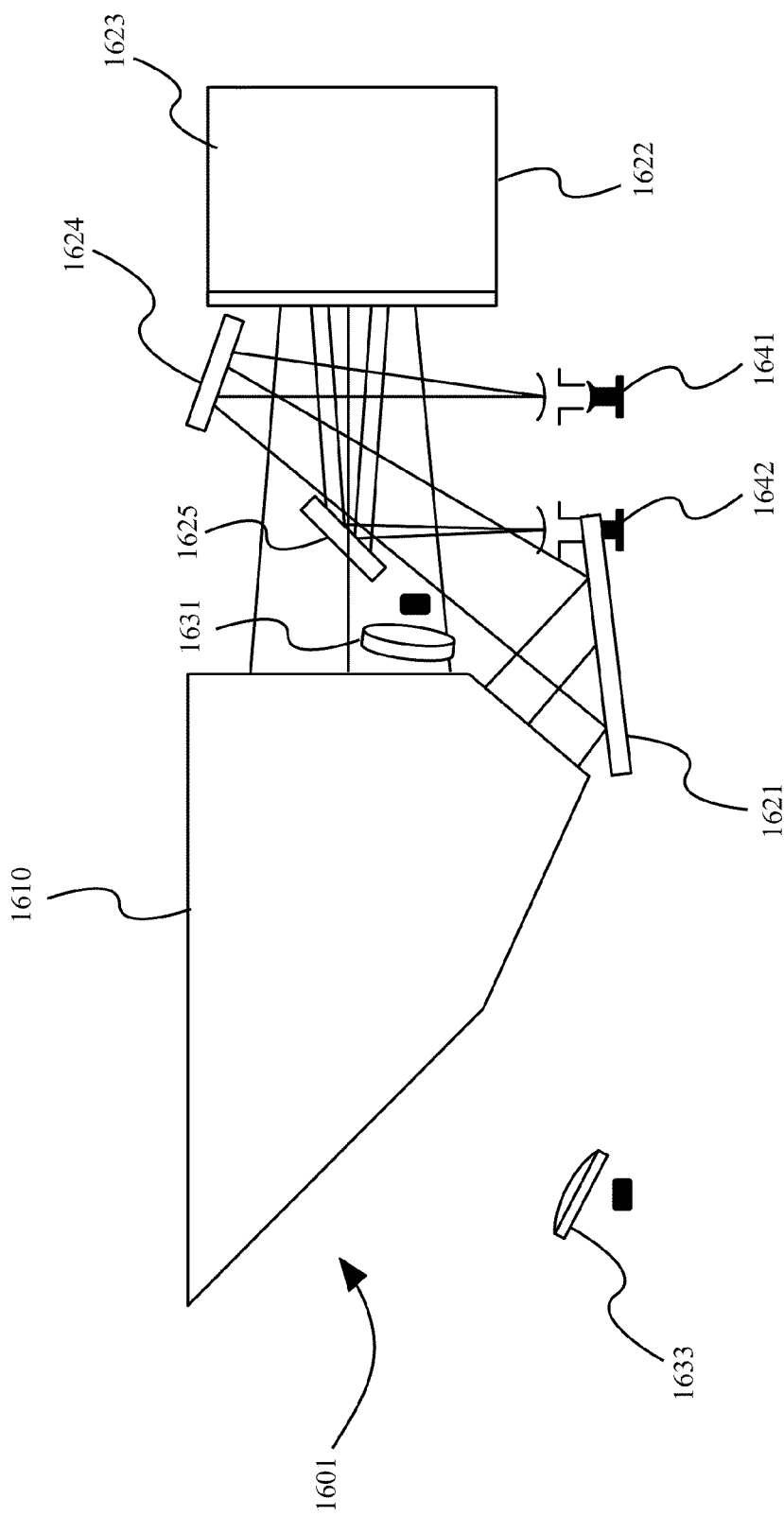
FIG. 18 provides a front view of a dual-imager biometric sensor, in accordance with various embodiments.

FIG. 17 shows the top view of dual-imager biometric sensor 1601 and FIG. 18 shows a front view of sensor 1601. Two illumination assemblies 1631 and 1632 are shown in FIG. 17. And FIG. 18 shows a third illumination assembly 1633 along with illumination assembly 1631. Each illumination assembly may comprise an illumination source as well as lenses, mirrors and/or other optics as necessary to shape and direct the illumination light. In some instances, more or less illuminators may be present. The illuminators 1631, 1632, and/or 1633 may come on simultaneously during an acquisition sequence, or sequentially, or pulsed or encoded in some manner.

In some embodiments the illuminators 1631, 1632, and/or 1633 may be of substantially different wavelengths in accordance with other aspects of various embodiments. Some embodiments may utilize illumination assemblies that may include illumination sources without other optics to shape and direct the illumination source. Some embodiments of a dual imaging sensor may also include other illumination assemblies or illumination sources as will be discussed below. For example, some embodiments may include an illuminator such as a flat light guide illuminated with LEDs, or a cold cathode fluorescent lamp (CCFL), or other illuminators known in the art that may be used as part of a TIR imaging.

Illumination light from any or all sources, such as 1631, 1632, and/or 1633, may illuminate the image region 1615. Light from a finger touching the sensor may then be imaged by the TIR image assembly 1641 after being reflected from mirrored surfaces 1621 and 1624. In some embodiments, a TIR image assembly, such as 1641, may not need reflecting surfaces such as 1621 and 1624 to make an image. Other embodiments may include more or less imaging surfaces that may be in different configurations. The finger touching the active image region 1615 may also be imaged by direct image assembly 1642 after reflections from surfaces 1622, 1623, and/or 1625. In some embodiments, a direct image assembly, such as 1642, may not need reflection surfaces such as 1622, 1623, and/or 1625. Other embodiments may use more or less reflecting surfaces, which also may be position and/or oriented in different configurations.

In one embodiment, direct image assembly 1642 may contain a color imager, as well as lenses, mirrors, optical filters, grating and other such optical elements as may be necessary to form an image as known in the art. TIR image assembly 1641 may contain a color imager or a monochromatic imager, as well as lenses, mirrors, optical filters, grating and other such optical elements as may be necessary to form an image as known in the art. In some embodiments that incorporate a monochromatic TIR imager, there may be a optical band pass filter in TIR image assembly 1641 that substantially passes the light from some number of the illuminators, such as 1631, 1632, and/or 1633, while blocking the light from others. In some embodiments, an optical filter that blocks out-of-band light ambient light may be included in either or both imaging paths.

Figure 19:
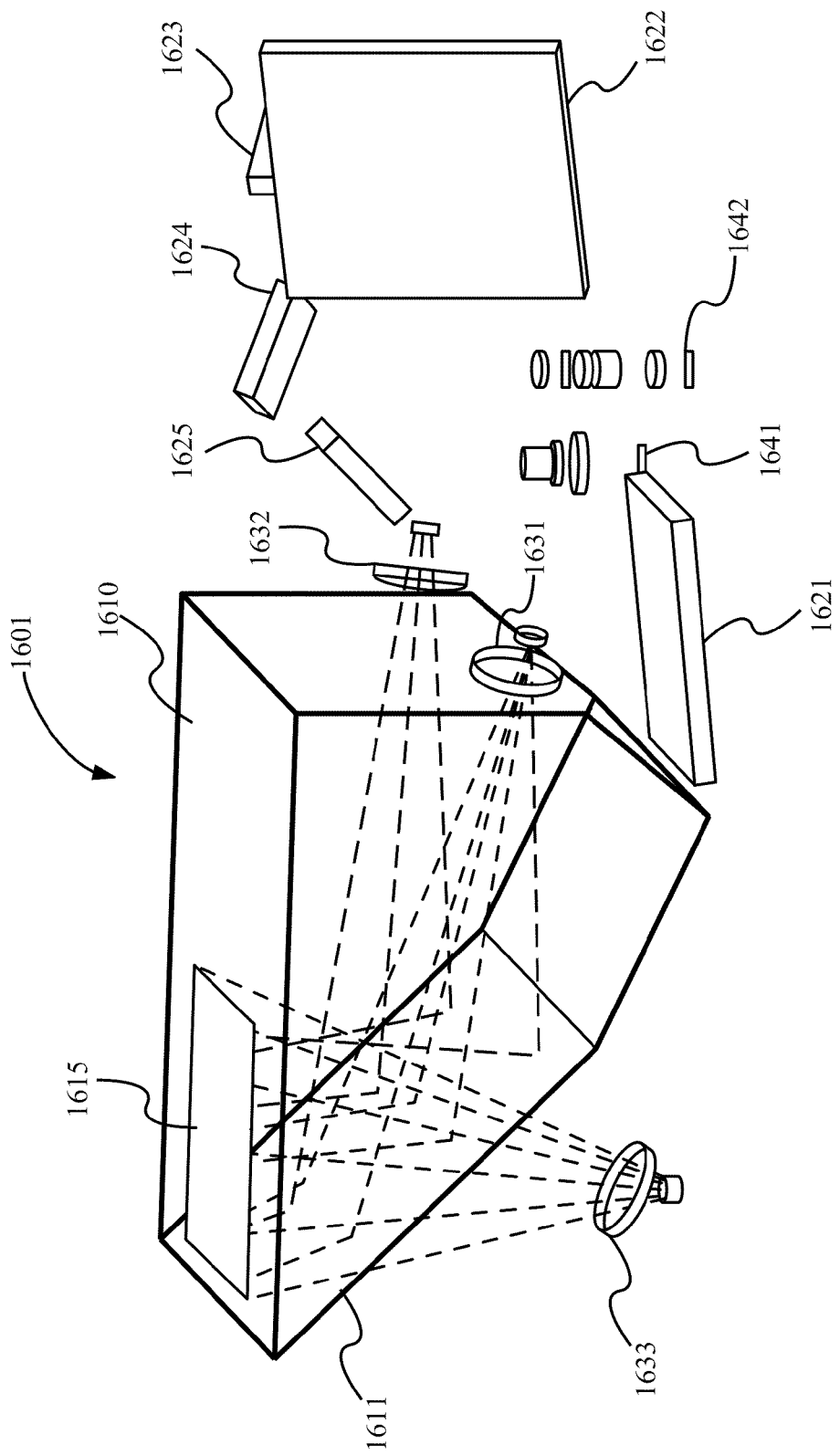
FIG. 19 depicts the simultaneous illumination of an image region of a dual-imager biometric sensor, in accordance with various embodiments.

FIG. 19 shows a three-dimensional view of sensor 1601. This illustration shows the simultaneous illumination of the image region 1615 of prism 1610 by illuminators 1631, 1632, and/or 1633. In some embodiments, illuminators 1631, 1632, and/or 1633 may be different colors (such as green, red and blue, respectively, merely by way of example; ultraviolet and/or infrared light may be used instead of or in addition to various visible wavelengths), in accordance with another aspect of various embodiments. The central wavelengths of the illuminators such as 1631, 1632, and/or 1633 as well as the spectral width and selection of which illuminator emits which color can all vary and such choices are within the scope of various embodiments. In some embodiments, as shown in FIG. 4 for example, an illuminator, such as 1631 and/or 1632, may be positioned such that light transmitted from the illuminator is totally internally reflected at a facet, such as facet 1611, of prism 1610 and then illuminates image region 1615. Some illuminators, such as 1633, may be positioned and/or oriented such that light passes through a facet, such as facet 1611 and then illuminates image region 1615.

Figure 20:
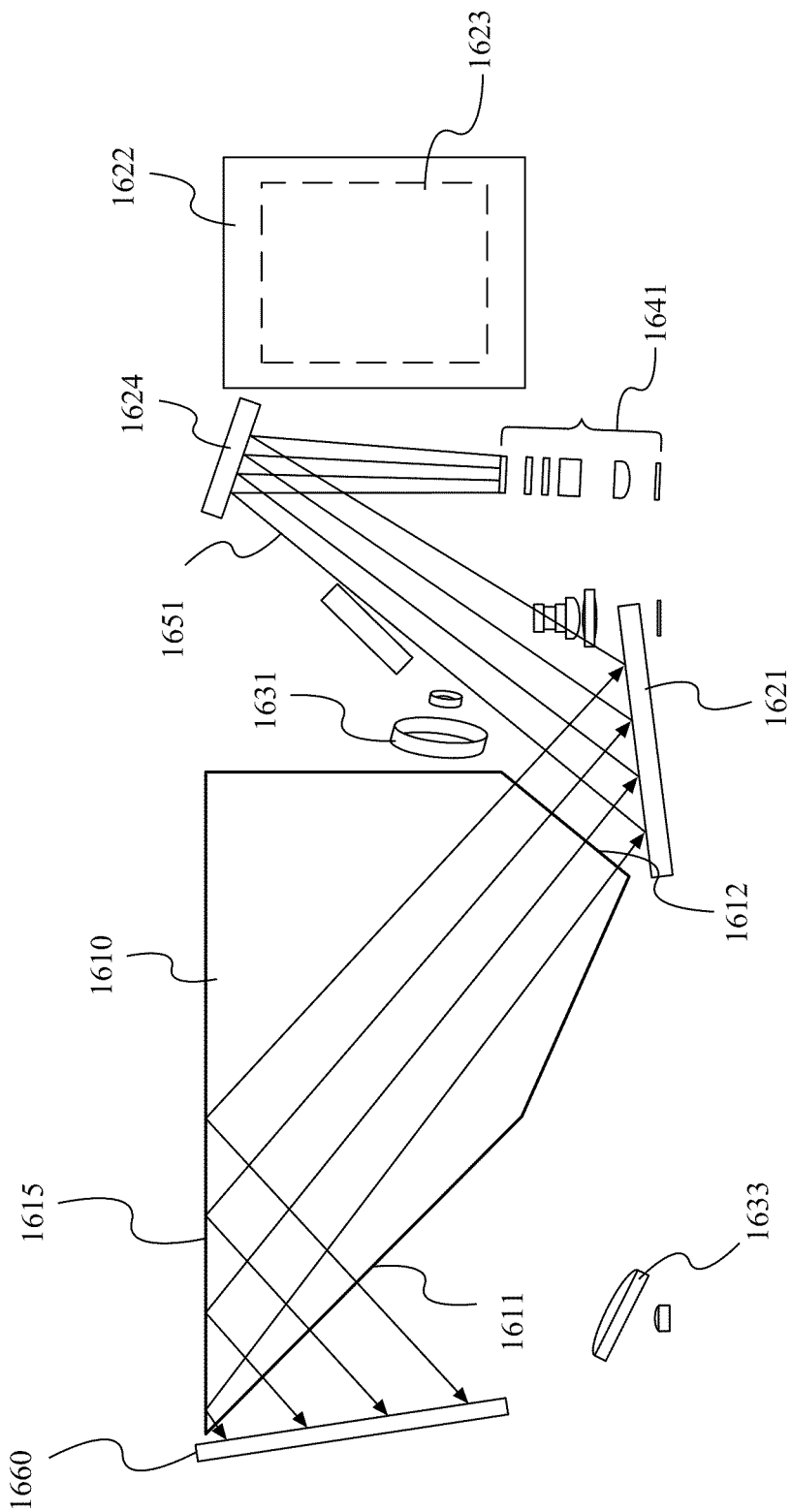
FIG. 20 depicts a total-internal-reflectance imaging path within a dual-imager biometric sensor, in accordance with various embodiments.

FIG. 20 depicts a TIR imaging path 1651. The TIR imaging assembly 1641, which may be referred to as a TIR imager in some embodiments, can view the active region 1615 of prism 1610 through prism facet 1612 and reflective surfaces 1621 and 1624. The angle between the TIR image bundle 1651 and the platen facet 1612 is such that the bundle 1651 can pass through the facet 1612. In some embodiments, the image bundle 1651 is substantially perpendicular to facet 1612. In some embodiments, facet 1612 may be oriented approximately perpendicular to an angle equal to or greater than the a critical angle with respect to facet 1615

In some embodiments, image bundle 1651 is oriented at an angle greater than the critical angle defined by the surface 1615 and the surrounding media, which is usually air. Because of this, it may be desirable to provide a black background for the TIR imager 1641 to view in cases where the TIR imager 1641 is operating in a dark-field illumination mode. In order to accomplish this, facet 1611 of prism 1610 may be oriented such that rays in the TIR bundle 1615 reflected through TIR at surface 1615 may be substantially able to pass out of prism 1610 through facet 1611. In some embodiments, a light trap (e.g., optical absorber) 1660, which may comprise a material with a matte black surface finish, may be positioned such that substantially all of the TIR bundle 1651 lands on the trap 1660.

In an alternative embodiment, the light trap 1660 may be replaced by an illuminator, such as a flat light guide illuminated with LEDs, or a cold cathode fluorescent lamp (CCFL), or other illuminators known in the art. In this alternate embodiment, the TIR imaging system operates in a bright-field illumination mode.

FIG. 21 depicts direct imaging ray bundle 1652 seen by direct imaging assembly 1642 in accordance with various embodiments. Direct image bundle 1652 may pass through facet 1613. In some embodiment, direct image bundle 1652 is approximately normal to facet 1613. In some embodiments, direct image bundle 1652 is oriented such that it is reflected due to TIR at facet 1611 and passes through image region 1615.

Figure 22:
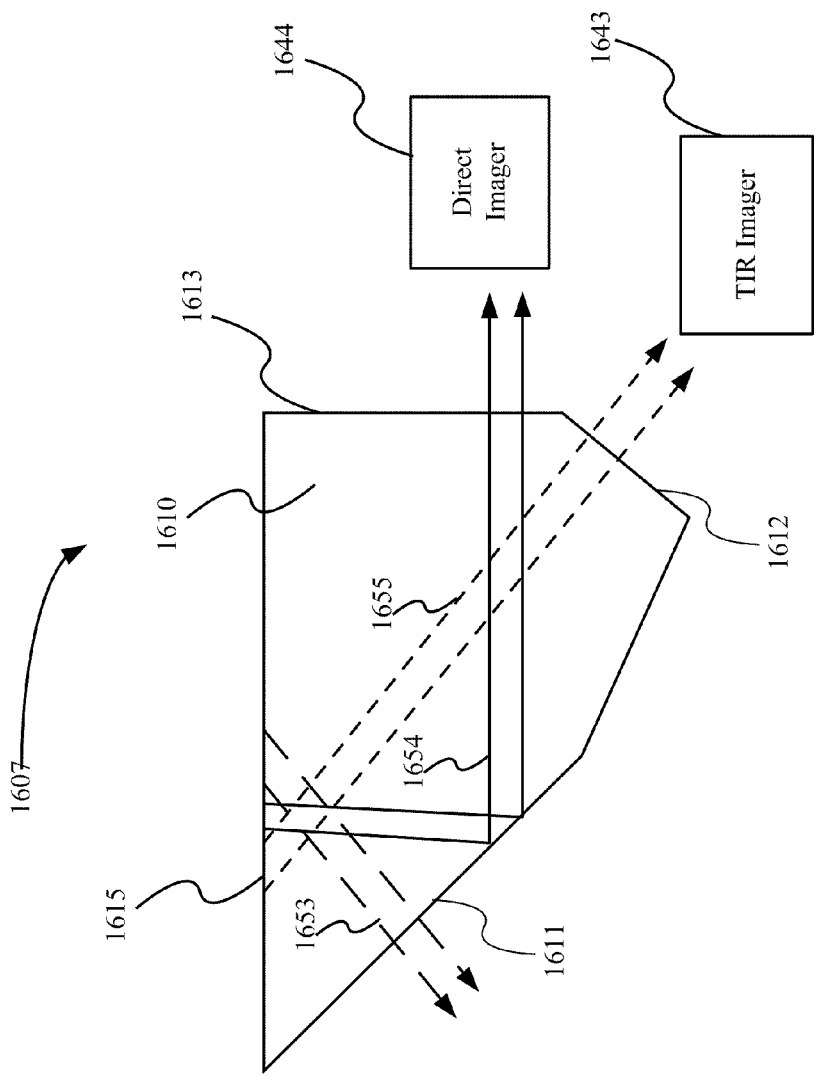
FIG. 22 provides a schematic diagram of a dual-imager biometric system, in accordance with various embodiments.

In some embodiments, facet 1611 may serve a dual role of being highly reflective for the direct imaging bundle 1652 and also being transmissive for TIR imaging bundle 1651 as illustrated in FIG. 22. In some embodiments, facet 1611 may serve a dual role of being highly reflective for light emanating from illuminators 1631 and/or 1632 and also being transmissive for light emanating from illuminator 1633. In some embodiments, facet 1611 may be variously reflective and transmissive for some combination of illumination and imaging bundles.

FIG. 22 provides a diagram of a dual imager sensor or system 1607 in accordance with various embodiments. System 1607 includes prism 1610 with multiple facets 1611, 1612, 1613, and 1615. System 1607 includes a direct imager 1644 and a TIR imager 1643. Direct imaging assembly 1642 of FIG. 21, for example, may be an example of direct imager 1644. Some embodiments may include direct imager 1644 that may include other optical components as described herein, such as mirrors, 1622, 1623, and 1625. TIR imaging assembly 1641 of FIG. 20, for example, may be an example of TIR imager 1643. Some embodiments may include TIR imager 1643 that may include other optical components as described herein, such as mirrors 1621 and/or 1624. Direct imager 1644 and TIR imager 1643 may be oriented and/or positioned in different configurations in different embodiments.

As described above, different facets of prism 1610 may provide different functions. For example, facet 1611 may serve a dual role of being highly reflective for direct imaging and also being transmissive for TIR imaging. As can be seen, a TIR bundle 1653 directed towards facet 1611 will transmit through facet 1611. A direct imaging bundle 1654 may reflect at facet 1611. In some embodiments, direct imaging bundle 1653 totally internally reflects at facet 1611. In addition, system 1607 shows an example of a facet 1613 that direct imaging bundle 1654 may pass through and then reach a direct imager 1644. Furthermore, a TIR bundle 1655 may pass through facet 1612 and then reach a TIR imager 1643.

Facets as seen in FIG. 22 may have different relationships with each other in order to affect the functions described for different embodiments. For example, facet 1615 and 1611 may be configured such that facet 1611 is oriented approximately perpendicular to an angle equal to or greater than the critical angle of facet 1615 such that light that undergoes TIR at facet 1615 may pass through facet 1611 before or after such TIR interaction. Similarly facet 1612 may be oriented approximately perpendicular to an angle equal to or greater than the critical angle of facet 1615 such that light totally internally reflect at facet 1615 may pass through facet 1612.

Prism 1610 may include facets such as 1613 that are oriented in different ways. For example, facet 1613 may be oriented relatively perpendicular to light that passed through facet 1615 and reflected from facet 1611 such that the light substantially passes through facet 1613.

System 1607 may also include different illumination sources. FIGS. 1 to 6, 16 to 21, and 24 to 25 show different examples with illumination sources. These figures also show different examples of orientations with respect to imagers. Illumination sources may be position and/or oriented in different ways to illuminate a finger, for example, place on prism 1610 along facet 1615, for example. Some embodiments may also include a controller, which may control imagers such as 1643 and 1643 along with illumination sources.

In some embodiments, sensors and systems may each collect images simultaneously using direct imagers such as 1642 or 1644 and TIR imager 1641 or 1643. If either of the images is multiplexed in the manner of the different embodiments, the image may be decomposed into the images corresponding to the different illumination conditions followed by interpolation and/or other processing of the resulting images. The resulting collection of images (both TIR and direct) may then be processed further in such a manner that a single, composite image of the fingerprint is generated. This composite image may then be reported to a host computer or other connected device.

In some embodiments, the TIR imager and direct imagers of sensors and systems may acquire synchronized video streams of images. These video streams may be acquired while the finger is rolled in the manner known in the art. The rolled image sequences may then be combined to produce a composite rolled print image.

In some embodiments, the fingerprint sensor of different embodiments may be used to collect non-fingerprint images. In particular, the direct imager may be used to acquire such images. Other image data so collected may include barcodes and documents. Optical security markings such as holograms, color-changing ink and other such markings may be present and used to confirm that the documents or barcodes by assessing the images that correspond to different illumination conditions.

In some embodiments, the direct imager of the different embodiments may be used to collect iris images, facial images, surveillance images, detect motion, detect ambient lighting conditions, and perform a variety of other such functions. In some embodiments the direct imager may include an automatic, variable focus ("autofocus") mechanism to facilitate additional imaging functionality.

Figure 23:
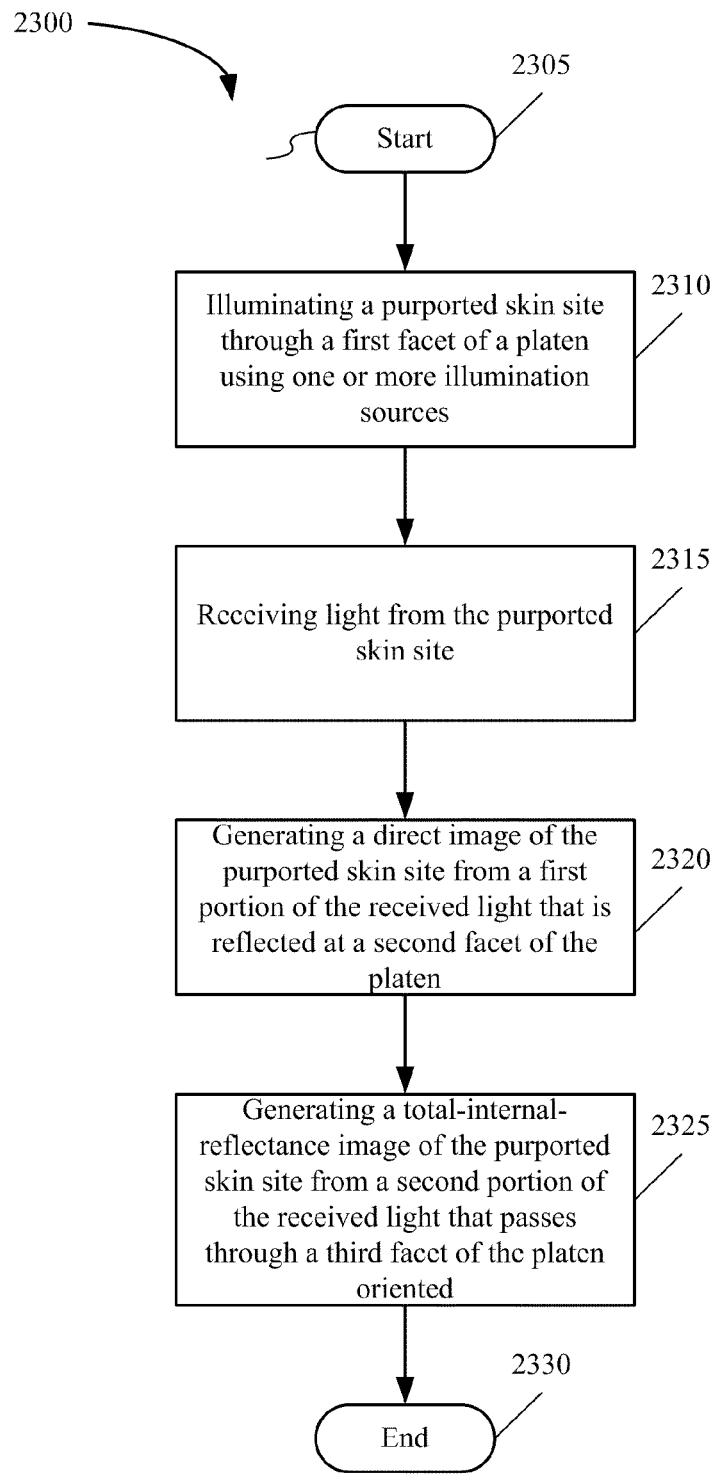
FIG. 23 provides a flow diagram of a method for creating composite biometric images from a two imager biometric system, in accordance with various embodiments.

FIG. 23 shows a flow diagram for process 2300 for creating composite biometric images from a two imager biometric system. Process 2300 may be implemented, for example, using sensors and systems as seen in FIGS. 15 to 22. Process 2300 can start at block 2305. At block 2310, a purported skin site is illuminated through a first facet of a platen using one or more illumination sources. At block 2315, light from the purported skin site is received. At block 2320, a direct image of the purported skin site is generated from a first portion of the received light that is reflected at a second facet of the platen. At block 2320, a total-internal-reflectance image of the purported skin site is generated from a second portion of the received light that passes through a third facet of the platen oriented. Process 2300 can end at block 2330. Any of these blocks can occur simultaneously. For instance, blocks 2310 and 2315 may occur at the same time as well as blocks 2320 and 2325.

In some embodiments of process 2300, a third portion of light is totally internally reflected at the first facet of the platen and then passes through the second facet of the platen. Some embodiments may further comprise absorbing the third portion of the light at a light trap located proximate to the second facet such that totally internally reflected light at the first facet that passes through the second facet is substantially absorbed by the light trap.

In some embodiments of process 2300, the light received by the direct imaging assembly that is reflected from the second facet of the platen is totally internally reflected at the second facet. In some embodiments, the second and third facets are oriented at substantially critical angles with respect to the first facet.

Some embodiments of process 2300 may include generating a composite image of the purported skin site using the total-internal-reflectance image and the direct image of the purported skin site. Some embodiments may include receiving light from the purported skin site that includes receiving the first portion of the received light at a total-internal-reflectance imaging assembly and receiving the second portion of the received light at a direct imaging assembly. Some embodiments may further comprise decomposing at least one of the images into multiple images corresponding to different illumination conditions.

Some embodiments of process 2300 may further comprise illuminating a non-skin site through the platen using one or more illumination sources. Light from the non-skin site is received and then a direct image of the non-skin site from a second portion of the received light may be generated. The non-skin site may include barcodes, documents, or optical security markings, for example. In some embodiments, the non-skin site may includes an iris, a portion of a face, a surveillance location, a moving object, or a lighting condition, for example.

Process 900, for example, can be executed by the computational device shown in FIG. 15.

In some embodiments of the invention, the TIR imager and direct imager may each collect images simultaneously. If either of the images is multiplexed in the manner described in some of the embodiments described herein, the image may be decomposed into the images corresponding to the different illumination conditions followed by interpolation and/or other processing of the resulting images. The resulting collection of images (both TIR and direct) may then be processed to create a single, composite image of the fingerprint. This composite image may then be reported to a host computer or other connected device.

In some embodiments, the TIR imager and direct imager may acquire synchronized video streams of images. These video streams may be acquired while the finger is rolled in the manner known in the art. The rolled image sequences may then be combined to produce a composite rolled print image.

Various other configuration can be used. For instance, a first illumination source (e.g. an LED) can be used to illuminating a finger through a first facet (e.g., facet 1615) of a multifaceted prism (e.g., prism 1610). Light from the first illumination source can undergo total internal reflectance at a second facet (e.g., 1611) of the multifaceted prism prior to illuminating the object. A first imager (e.g., 1644) can image light scattered from the finger and passing though the first facet at an angle less than the critical angle and undergoing total internal reflectance at the second facet. A second imager can image light scattered from the finger and passing through the first facet at an angle less than the critical angle. In some embodiments, the second imager can be located in a position such that it does not image light from the second illumination source that is totally internally reflected at the first facet.

In some embodiments, the second imager can be located out of phase from the second illumination source. That is light from the second illumination source can only image light from the second imager after it is absorbed and/or scattered by the object. And, in this embodiment, light totally internally reflected at the first facet is not imaged by the second imager. For example, the second imager can be located at an azimuthal angle out of line with the second illumination source; such as an angle less than 170°. In some embodiments, this angle is 90°. The second imager can also be located to image light at greater or less than the critical angle.

In another embodiment, a first illumination source can illuminate an object located at a first facet (e.g., 1615) of a multifaceted prism (e.g., 1610). The system can include a second illumination source that can illuminate the object through a second facet (e.g., 1611) and through the first facet at an angle greater than the critical angle of the first facet. A first imager (e.g., 1644) can image light scattered by the object that passes through the first facet at an angle less than the critical angle and undergoes total internal reflectance at the second facet. A second imager (1643) can be used to image light totally internally reflected from the first facet.

In some embodiments, the fingerprint sensor of the present invention may be used to collect non-fingerprint images; for example, money, documents, bar codes, manufactured parts, etc. In some of these images optical security markings such as holograms, color-changing ink and other such markings may be present and used to confirm that the documents or barcodes by assessing the images that correspond to different illumination conditions.

In some embodiments, the dual imager of the present invention may be used to collect finger or hand print images as well as iris images, facial images, surveillance images, detect motion, detect ambient lighting conditions, barcode images, security document images, and perform a variety of other such functions. In some embodiments the direct imager may include an automatic, variable focus ("autofocus") mechanism to facilitate additional imaging functionality.

What is claimed is:

1. A biometric system comprising:
    first illumination means for illuminating an object through an image region of a first facet of a multifaceted prism, wherein light from the first illumination means undergoes total internal reflectance at a second facet of the multifaceted prism prior to illuminating the object, and the image region is smaller than the first facet;
    second illumination means for illuminating the object through the second facet of the multifaceted prism; and
    first imaging means for imaging light scattered from the object and passing though the image region of the first facet at an angle less than the critical angle and undergoing total internal reflectance at the second facet, wherein the scattered light originates from both the first and second illumination means, and the critical angle is defined by an interface of the first facet with an external environment and is measured relative to the normal of the first facet.

2. The system of claim 1, further comprising second imaging means for imaging light scattered from the finger and passing though the first facet at an angle greater than the critical angle.

3. The system claim 1, further comprising a light trap located proximate to the second facet such that light undergoing total internal reflectance at the first facet that passes through the second facet is substantially absorbed by the light trap.

4. The system of claim 2, further comprising a controller interfaced with the first illumination means, the second illumination means, the first imaging means, and the second imaging means, the controller including:
    instructions to illuminate the finger with the first and second illumination means during a single illumination session;
    instructions to generate a total-internal reflectance image of the finger from light received by the second imaging means; and
    instructions to generate a direct image of the finger from light received by the first imaging means.

5. The system of claim 4, wherein the controller interface further includes instructions to generate composite image of the finger using the first imaging means image and the second imaging means image of the finger.

6. The system of claim 2, wherein the first imaging means and the second imaging means are configured to receive light simultaneously.

7. The system of claim 2, wherein the first imaging means and the second imaging means are configured to acquire synchronized video streams.

8. The system of claim 2, wherein at least one of first imaging means or the second imaging means comprises a multispectral imaging means.

9. The system of claim 1, wherein the first illumination means and the second illumination means comprise different wavelengths.

10. A method comprising:
    illuminating an object positioned at an image region of a first facet with light that undergoes total internal reflectance at a second facet, the image region is smaller than the first facet;
    illuminating the object positioned at the image region of the first facet with light that passes through the second facet;
    imaging light scattered by the object that passes through the image region of the first facet at an angle less than the critical angle and undergoes total internal reflectance at the second facet; and
    imaging light scattered by the object that passes through the image region of the first facet at an angle greater than the critical angle, wherein the critical angle is defined by an interface of the first facet with an external environment and is measured relative to the normal of the first facet.

11. The method of claim 10, further comprising absorbing light at a light trap located proximate to the second facet, so that the light undergoes total-internal-reflectance at the first facet and then passes through the second facet and is substantially absorbed by the light trap.

12. The method of claim 10, further comprising generating a composite image of the object using the image from light scattered by the object that passes through the first facet at the angle less than the critical angle and undergoes total internal reflectance at the second facet and the image from light scattered by the object that passes through the first facet at the angle greater than the critical angle.

13. The method of claim 10, further comprising decomposing at least one of the images into a plurality of images corresponding to different illumination conditions.

14. The method of claim 10, wherein the object comprise a barcode, a document, or money.

15. A multifaceted prism comprising:
a first facet having an image region that is smaller than the first facet; and
a second facet, wherein the first facet and the second facet are oriented relative to each other such that:
an object positioned at the image region of the first facet can be illuminated with light that undergoes total internal reflectance at the second facet and by light that passes through the second facet, a portion of light scattered by the object that passes through the image region of the first facet at an angle less than the critical angle can be imaged after undergoing total internal reflectance at the second facet, and a portion of light scattered by the object positioned at the image region of the first facet that passes through the image region of the first facet at an angle greater than the critical angle can be imaged without interacting with the second facet, wherein the critical angle is defined by an interface of the first facet with an external environment and is measured relative to the normal of the first facet.

16. The multifaceted prism of claim 15, further comprising:
a third facet oriented with respect to the first and second facets such the portion of light scattered by the object that passes through the first facet at an angle less than the critical angle and undergoing total internal reflectance at the second facet then passes through the third facet.

17. The multifaceted prism of claim 16, wherein the third facet is oriented substantially perpendicular to the first facet.

18. The multifaceted prism of claim 15, further comprising:
a fourth facet oriented with respect to the first and second facets such that the portion of light scattered by the object positioned at the first facet that passes through the first facet at an angle greater than the critical angle passes through the fourth facet.

19. The multifaceted prism of claim 18, wherein the fourth facet is oriented at an angle greater than or equal the critical angle with respect to the first facet.

20. A system comprising:
first illumination means for illuminating an object located at an image region of a first facet of a multifaceted prism, the image region being smaller than the first facet, light from the first illumination means internally reflecting off of a second facet of the multifaceted prism prior to illuminating the object;
second illumination means for illuminating the object through the second facet and through the image region of the first facet at an angle greater than the critical angle of the first facet;
first imaging means for imaging light scattered by the object, passes through the image region of the first facet at an angle less than the critical angle, and undergoes total internal reflectance at the second facet; and
second imaging means for imaging light totally internally reflected from the image region of the first facet, wherein the critical angle is defined by an interface of the first facet with an external environment and is measured relative to the normal of the first facet.

21. The system according to claim 20, wherein the first illumination means and the second illumination means have distinct wavelengths.

22. The system according to claim 20, wherein the second imaging means is oriented to image light totally internally reflected from the interface of the object and the first facet.

23. The system according to claim 22, wherein the first illumination means illuminates the object at an angle less than the critical angle of the first facet.

24. The system according to claim 20, wherein the first imaging means and the second imaging means are configured to acquire synchronized video streams.

25. A system comprising:
first illumination means for illuminating an object located at an image region of a first facet of a multifaceted prism, the image region being smaller than the first facet, light from the first illumination means internally reflecting off of a second facet of the multifaceted prism prior to illuminating the object;
second illumination means for illuminating the object through the second facet and through the image region of the first facet at an angle greater than the critical angle of the first facet;
first imaging means for imaging light scattered by the object, passes through the image region of the first facet at an angle less than the critical angle, and undergoes total internal reflectance at the second facet; and
second imaging means for imaging light scattered from the object at points where the object is in contact with the platen, wherein the critical angle is defined by an interface of the image region of the first facet with an external environment and is measured relative to the normal of the first facet.

26. The system according to claim 25, wherein the second imaging means images the first facet at an angle less than the critical angle.

27. The system according to claim 25, wherein the second imaging means images the first facet at an elevation angle greater than the critical angle.

28. The system according to claim 25, wherein the second imaging means images the first facet at an azimuth angle less than 170° relative to the second illumination means.

29. The system according to claim 25, wherein the first illumination means and the second illumination means have distinct wavelengths.

30. A method comprising:
illuminating an object located at an image region of a first facet of a prism at an angle less than the critical angle with light that internally reflects off of a second facet of the prism prior to illuminating the object, the image region being smaller than the first facet;
illuminating the object at the image region of the first facet at an angle greater than the critical angle, wherein the light enters the prism through the second facet of the prism;
imaging light that is scattered by the object at an angle less than the critical angle relative to the first facet and totally internally reflected at the second facet using a first imaging system; and
imaging light from the image region of the first facet using a second imaging system, wherein the critical angle is defined by an interface of the first facet with an external environment and is measured relative to the normal of the first facet.

31. The method of claim 30, wherein imaging light from the first facet using a second imaging system further comprises imaging light totally internally reflected from the first facet using the second imaging system.

32. The method of claim 30, wherein imaging light from the first facet using a second imaging system further comprises imaging light scattered by the object at object-facet interface using the second imaging system.

33. The method of claim 30, wherein illuminating the object located at the first facet of the prism at an angle less than the critical angle and illuminating the object at the first facet at the angle greater than the critical angle with light having distinct wavelengths.

34. The method of claim 30 further comprising generating a composite image of the object using the images created by a first imaging system and the second imaging system.

35. A system comprising:
  a multifaceted prism having a first and second facet, the first facet having an image region that is smaller than the first facet;
  a first illumination source configured to illuminate the image region of the first facet at an angle less than the critical angle, light from the first illumination source internally reflecting off of the second facet of the multifaceted prism prior to illuminating the image region of the first facet;
  a second illumination source configured to illuminate the image region of the first facet at an angle greater than the critical angle, wherein light from the second illumination source enters the prism through the second facet;
  a first imager configured to image light from the image region of the first facet that is totally internally reflected by the second facet; and
  a second imager configured to image light from the first illumination source that is totally internally reflected from the image region of the first facet, wherein the critical angle is defined by an interface of the first facet with an external environment and is measured relative to the normal of the first facet.

36. A system comprising:
  a multifaceted prism having a first and second facet, the first facet having an image region that is smaller than the first facet;
  a first illumination source configured to illuminate the image region of the first facet at an angle less than the critical angle with light that internally reflects off of the second facet prior to illuminating the image region of the first facet;
  a second illumination source configured to illuminate the image region of the first facet at an angle greater than the critical angle, wherein light from the second illumination source enters the prism through the second facet;
  a first imager configured to image light from the image region of the first facet that is totally internally reflected by the second facet; and
  a second imager configured to image light scattered from the interface of the object and the image region of the first facet, wherein the critical angle is defined by an interface of the first facet with an external environment and is measured relative to the normal of the first facet.

37. The system according to claim 36, wherein the second imager images light at an elevation angle less than the critical angle.

38. The system according to claim 36, wherein the second imager images light at an elevation angle greater than the critical angle.

39. The system according to claim 36, wherein the second imager images light at an azimuth angle out of phase with the second illumination source.

40. The system of claim 1, wherein the first illumination means and the second illumination means illuminate the object concurrently.

41. The system of claim 1, wherein the first illumination means and the second illumination means illuminate the object sequentially.

* * * * *